(12) United States Patent
Jung et al.

(10) Patent No.: US 11,531,150 B2
(45) Date of Patent: Dec. 20, 2022

(54) PHOTONIC CRYSTAL STRUCTURE AND ANTI-FORGERY COLOR CONVERSION FILM COMPRISING SAME

(71) Applicant: KOREA RESEARCH INSTITUTE OF CHEMICAL TECHNOLOGY, Daejeon (KR)

(72) Inventors: Seo Hyun Jung, Ulsan (KR); Jong Mok Park, Daejeon (KR); Ho Youl Kong, Gyeongsangnam-do (KR); Ja Young Bae, Ulsan (KR)

(73) Assignee: KOREA RESEARCH INSTITUTE OF CHEMICAL TECHNOLOGY, Daejeon (KR)

( * ) Notice: Subject to any disclaimer, the term of this patent is extended or adjusted under 35 U.S.C. 154(b) by 840 days.

(21) Appl. No.: 16/475,539

(22) PCT Filed: Jan. 3, 2018

(86) PCT No.: PCT/KR2018/000111
§ 371 (c)(1),
(2) Date: Jul. 2, 2019

(87) PCT Pub. No.: WO2018/128381
PCT Pub. Date: Jul. 12, 2018

(65) Prior Publication Data
US 2020/0225391 A1    Jul. 16, 2020

(30) Foreign Application Priority Data

Jan. 4, 2017   (KR) .................. 10-2017-0001325
Jun. 2, 2017   (KR) .................. 10-2017-0069200

(51) Int. Cl.
*G02B 5/28* (2006.01)
*C03C 17/34* (2006.01)
(Continued)

(52) U.S. Cl.
CPC ............ *G02B 5/286* (2013.01); *B42D 25/36* (2014.10); *C03C 17/3405* (2013.01); *C08J 5/18* (2013.01);
(Continued)

(58) Field of Classification Search
USPC ......................................................... 359/589
See application file for complete search history.

(56) References Cited

U.S. PATENT DOCUMENTS

2005/0259326 A1   11/2005   Weber et al.
2012/0293802 A1   11/2012   Ozjn et al.
2016/0252625 A1    9/2016   Hayward et al.

FOREIGN PATENT DOCUMENTS

CN    105473647 A    4/2016
JP    H0616720 A     1/1994
(Continued)

OTHER PUBLICATIONS

International Search Report for PCT/KR2018/000111 dated May 29, 2018.
(Continued)

*Primary Examiner* — Collin X Beatty
*Assistant Examiner* — Grant A Gagnon
(74) *Attorney, Agent, or Firm* — The PL Law Group, PLLC

(57) ABSTRACT

An anti-forgery color conversion film includes a photonic crystal structure whose color is converted by an external stimulus such as a breath. The photonic crystal structure includes a first refractive index layer including a first polymer exhibiting a first refractive index; and a second refractive index layer which is alternately laminated with the first refractive index layer and includes a second polymer exhibiting a second refractive index. A consumer who purchases (Continued)

an article including the color conversion film may easily distinguish the authenticity of the article.

20 Claims, 5 Drawing Sheets

(51) Int. Cl.

| | | |
|---|---|---|
| C08J 5/18 | (2006.01) | |
| B42D 25/36 | (2014.01) | |
| C08L 25/16 | (2006.01) | |
| C08L 33/02 | (2006.01) | |
| C08L 33/26 | (2006.01) | |
| C08L 39/04 | (2006.01) | |
| C08L 39/06 | (2006.01) | |
| G02B 1/00 | (2006.01) | |

(52) U.S. Cl.
CPC .............. *C08L 25/16* (2013.01); *C08L 33/02* (2013.01); *C08L 33/26* (2013.01); *C08L 39/04* (2013.01); *C08L 39/06* (2013.01); *G02B 1/005* (2013.01); *C03C 2217/70* (2013.01); *C03C 2218/116* (2013.01); *C08J 2325/16* (2013.01); *C08J 2333/02* (2013.01); *C08J 2333/26* (2013.01); *C08J 2339/04* (2013.01); *C08J 2339/06* (2013.01); *C08J 2425/16* (2013.01); *C08J 2433/02* (2013.01); *C08J 2433/26* (2013.01); *C08J 2439/04* (2013.01); *C08J 2439/06* (2013.01); *C08L 2203/16* (2013.01); *C08L 2205/025* (2013.01)

(56) References Cited

FOREIGN PATENT DOCUMENTS

| JP | H0868907 A | 3/1996 |
|---|---|---|
| JP | 1029369 A | 2/1998 |
| JP | 2011085959 A | 4/2011 |
| JP | 2014092646 A | 5/2014 |
| KR | 10-1675833 B1 | 11/2016 |
| KR | 10-1710266 B1 | 2/2017 |

OTHER PUBLICATIONS

Chiappelli, M. C. et al., "Photonic Multilayer Sensors from Photo-Crosslinkable Polymer Films", Advanced Materials, vol. 24, No. 45, pp. 6100-6104, 2012.
Samyn, P. et al., "Fluorescent sensibility of microarrays through functionalized adhesive polydiacetylene vesicles", Sensors and Actuators A: Physical, vol. 214, pp. 45-57, 2014.
Samyn, P. et al., "Colorimetric sensing properties of catechol-functional polymerized vesicles in aqueous solution and at solid surfaces", Colloids and Surfaces A: Physicochemical and Engineering Aspects, vol. 441, pp. 242-254, 2014.
James E. McGrath et al. "Novel carbazole phenoxy-based methacrylates to produce high-refractive index polymers" Polymer, vol. 47, 2006, pp. 4042-4057.
Polysciences "Poly(N-vinylcarbazole) (PVK)", www.polysciences.com, Jul. 1, 2007, Technical Data Sheet #263, p. 1.
European Search Report For EP18735952.6 dated Jun. 2, 2020 from European patent office in a counterpart European patent application.
Office action dated Sep. 16, 2020 from China Patent Office in a counterpart China Patent Application No. CN201880005901.6 (all the cited references are listed in this IDS.) (English translation is also submitted herewith.).
Office action dated Sep. 1, 2020 from Japan Intellectual Property Office in a counterpart Japanese Patent Application No. 2019-536832 (all the cited references are listed in this IDS.) (English translation is also submitted herewith.).

PHOTONIC CRYSTAL STRUCTURE AND ANTI-FORGERY COLOR CONVERSION FILM COMPRISING SAME

CROSS REFERENCE TO RELATED APPLICATIONS AND CLAIM OF PRIORITY

This application claims benefit under 35 U.S.C. 119(e), 120, 121, or 365(c), and is a National Stage entry from International Application No. PCT/KR2018/000111, filed Jan. 3, 2018, which claims priority to the benefit of Korean Patent Application No. 10-2017-0001325 filed on Jan. 4, 2017 and 10-2017-0069200 filed on Jun. 2, 2017 in the Korean Intellectual Property Office, the entire contents of which are incorporated herein by reference.

TECHNICAL FIELD

The present invention relates to a photonic crystal structure and an anti-forgery color conversion film including the same.

BACKGROUND ART

Recently, forgery and alteration of a brand product have emerged as social problems, and various techniques for preventing the forgery and alteration have been developed. For example, there are techniques such as holograms attached to the products form of anti forgery stickers, radio frequency identification (RFID) tags in a form of electronic tags, optical variable ink (OVI) implemented through a printing method, braille, intaglio printing or the like.

The most typical technique is the hologram, and the hologram is a medium in which interference patterns for reproducing stereoscopic images are recorded, which is made using a holographic principle. However, there is a limit in information that can be recorded with such a hologram, which makes it difficult to produce an elaborate hologram, as well as it has been difficult for consumers to substantially distinguish its authenticity.

In addition, the RFID tag, which stores data read from a unique ID or sensor and transmits information in various ways upon requesting the same by a reader, is bulky and expensive, such that it is costly to apply to the product. Further, a separate reader is required to distinguish its authenticity, such that it is not easy for the consumers to use.

Further, the optically variable ink (OVI) shown in different colors depending on a viewing angle is widely applied to security printed matters such as banknotes, but it is difficult for the general public such as a consumer to distinguish a change in the color, and there is a limit in an applicable product.

Thereby, there is still a need for an anti-forgery technique that can be attached to various products requiring the anti-forgery at low costs, while allowing the general consumer to easily distinguish the authenticity of the products.

As a result, the present inventors found that, when attaching a color conversion film to an article requiring prevention of forgery by using a photonic crystal structure whose color is converted by an external stimulus such as a breath as described below, the general consumer can easily distinguish the authenticity of the article, and the present invention has been completed on the basis of the finding.

SUMMARY

It is an object of the present invention to provide an anti-forgery color conversion film which includes a plurality of photonic crystal structures whose colors are converted by an external stimulus, thereby allowing general consumers to easily distinguish the authenticity of articles.

In addition, it is another object of the present invention to provide an article including the anti-forgery color conversion film.

1. An anti-forgery color conversion film including: a photonic crystal structure whose color is converted by an external stimulus, wherein the photonic crystal structure includes: a first refractive index layer including a first polymer exhibiting a first refractive index; and a second refractive index layer which is alternately laminated with the first refractive index layer and includes a second polymer exhibiting a second refractive index, wherein the first refractive index and the second refractive index are different from each other, and one of the first polymer and the second polymer is a copolymer including a repeating unit represented by Formula 1 below:

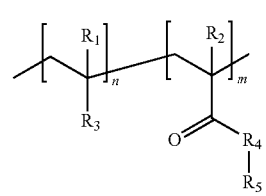

[Formula 1]

(wherein $R_1$ and $R_2$ are each independently hydrogen or $C_{1-3}$ alkyl, $R_3$ is represented by Formula 2 or 3 below, $R_4$ is O or NH, $R_5$ is benzoylphenyl, wherein the benzoylphenyl is unsubstituted, or substituted with one to four substituents each independently selected from the group consisting of hydroxy, halogen, nitro, $C_{1-5}$ alkyl and $C_{1-5}$ alkoxy, n and m are each independently an integer of 1 or more, and n+m is 100 to 2,000.)

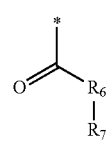

[Formula 2]

(wherein $R_6$ is O or NH, $R_7$ is H, $C_{1-10}$ alkyl, $C_{1-10}$ aminoalkyl, $C_{1-10}$ fluoroalkyl or

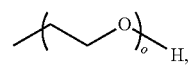

and o is an integer of 1 to 10.)

[Formula 3]

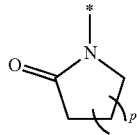

(wherein p is an integer of 1 to 4).

2. The anti-forgery color conversion film according to the above 1, wherein $R_1$ and $R_2$ are each independently hydrogen or methyl, $R_3$ is represented by Formula 2, $R_6$ is NH, and $R_7$ is fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1-fluoropropyl, 2-fluoropropyl, 1,1-difluoropropyl, 1,2-difluoropropyl, 2,2-difluoropropyl, 1,1,2-trifluoropropyl, 1,2,2-trifluoropropyl, 2,2,2-trifluoropropyl, 1-fluorobutyl, 2-fluorobutyl, 1,1-difluorobutyl, 1,2-difluorobutyl, 2,2-difluorobutyl, 1,1,2-trifluorobutyl, 1,2,2-trifluorobutyl or 2,2,2-trifluorobutyl.

3. The anti-forgery color conversion film according to the above 1, wherein the copolymer represented by Formula 1 is one of copolymers including repeating units represented by Formulae 1-1 to 1-10 below:

[Formula 1-1]

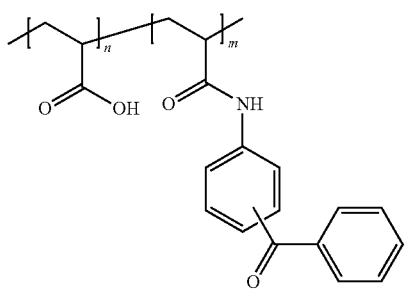

[Formula 1-2]

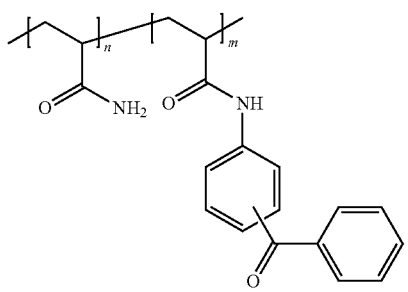

[Formula 1-3]

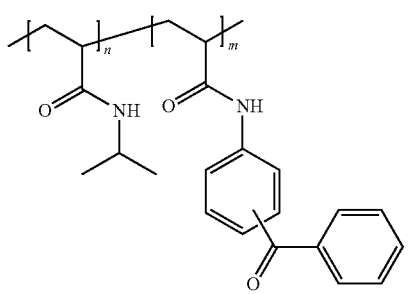

[Formula 1-4]

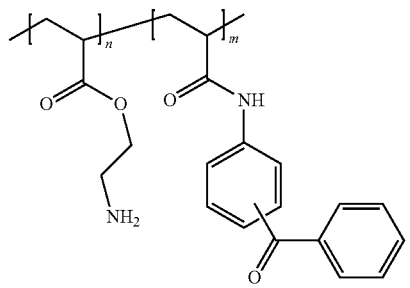

[Formula 1-5]

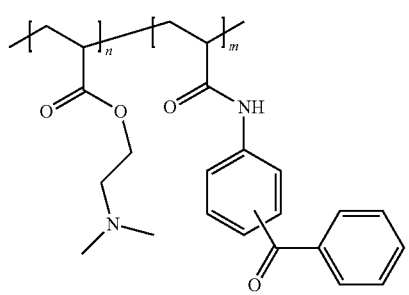

[Formula 1-6]

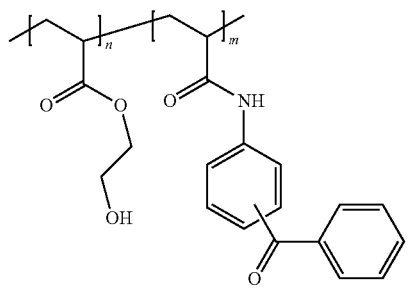

[Formula 1-7]

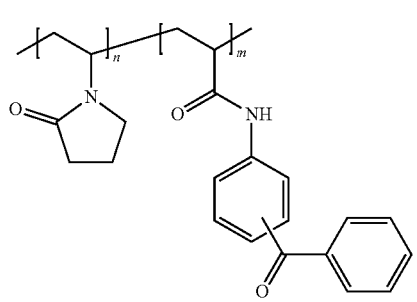

[Formula 1-8]

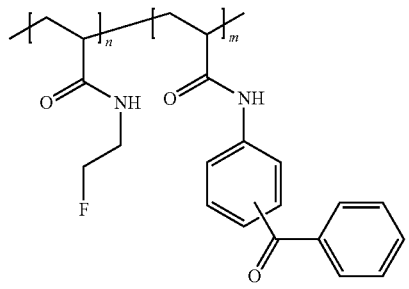

[Formula 1-9]

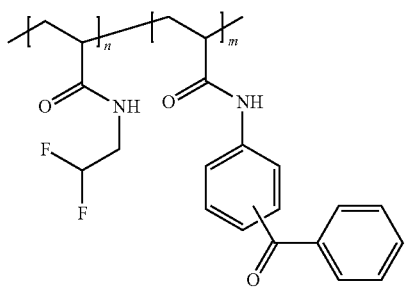

[Formula 1-10]

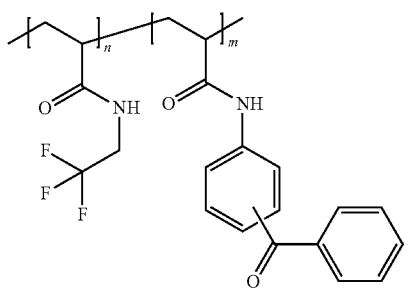

(wherein n and m are each independently an integer of 1 or more, and n+m is 100 to 2,000).

4. The anti-forgery color conversion film according to the above 1, wherein the external stimulus is a relative humidity of 70% or more.

5. The anti-forgery color conversion film according to the above 1, including a plurality of photonic crystal structures, wherein the respective photonic crystal structures are converted into different colors from each other by the external stimulus.

6. The anti-forgery color conversion film according to the above 1, wherein the copolymer including the repeating unit represented by Formula 1 is swelled by the external stimulation, such that a reflection wavelength thereof is shifted.

7. The anti-forgery color conversion film according to the above 1, wherein another of the first polymer and the second polymer is a copolymer including a repeating unit represented by Formula 4 or 5 below:

[Formula 4]

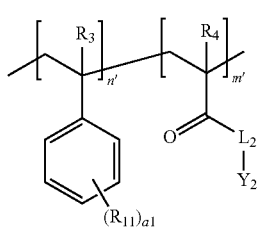

[Formula 5]

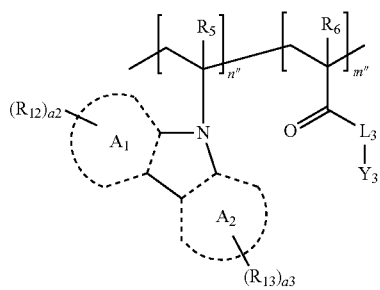

(wherein $R_3$ to $R_6$ are each independently hydrogen or $C_{1-3}$ alkyl $A_1$ and $A_2$ are each independently a $C_{6-20}$ aromatic ring or $C_{2-20}$ heteroaromatic ring, $R_{11}$ to $R_{13}$ are each independently hydroxy, cyano, nitro, amino, halogen, $SO_3H$, $SO_3(C_{1-5}$ alkyl), $C_{1-10}$ alkyl or $C_{1-10}$ alkoxy, a1 to a3 are each independently an integer of 0 to 5, $L_2$ and $L_3$ are each independently O or NH, $Y_2$ and $Y_3$ are each independently benzoylphenyl, $Y_2$ and $Y_3$ are unsubstituted, or substituted with one to four substituents each independently selected from the group consisting of hydroxy, halogen, nitro, $C_{1-5}$ alkyl and $C_{1-5}$ alkoxy, n' and m' are each independently an integer of 1 or more, n'+m' is 100 to 2,000, n" and m" are each independently an integer of 1 or more, and n"+m" is 100 to 2,000).

8. The anti-forgery color conversion film according to the above 7, wherein $R_3$ to $R_6$ are each independently hydrogen or methyl, $A_1$ and $A_2$ are each independently a benzene ring or naphthalene ring, $R_{11}$ to $R_{13}$ are each independently hydrogen, methyl, ethyl, propyl, isopropyl, butyl, isobutyl, sec-butyl or tert-butyl, and a1 to a3 are each independently 0, 1 or 2.

9. The anti-forgery color conversion film according to the above 7, wherein the copolymer is a copolymer including a repeating unit represented by Formula 5-1 or 5-2 below:

[Formula 5-1]

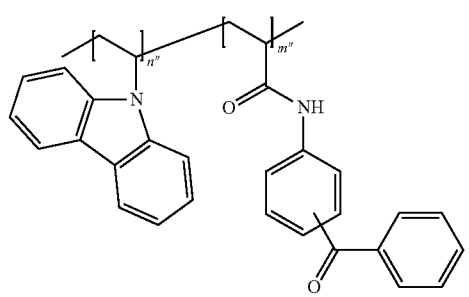

[Formula 5-2]

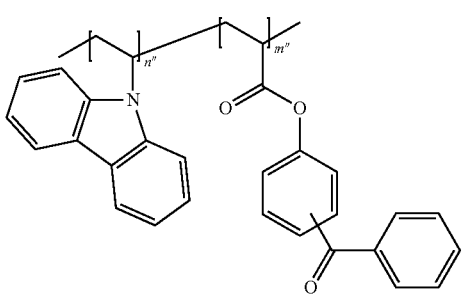

(wherein n" and m" are each independently an integer of 1 or more, and n"+m" is 100 to 2,000).

10. The anti-forgery color conversion film according to the above 5, wherein the plurality of photonic crystal structures have each independently 3 to 30 layers as a total number of the laminated layers of the first refractive index layer and the second refractive index layer.

11. The anti-forgery color conversion film according to the above 1, wherein the first refractive index layer is a high refractive index layer having a thickness of 50 to 150 nm, and the second refractive index layer is a low refractive index layer having a thickness of 5 to 100 nm.

12. An article including the anti-forgery color conversion film according to any one of the above 1 to 11.

13. A photonic crystal structure whose color is converted by an external stimulus, including:

a first refractive index layer including a first polymer exhibiting a first refractive index; and a second refractive index layer which is alternately laminated with the first refractive index layer and includes a second polymer exhibiting a second refractive index, wherein the first refractive index and the second refractive index are different from each other, and one of the first polymer and the second polymer is a copolymer including a repeating unit represented by Formula 1 below:

[Formula 1]

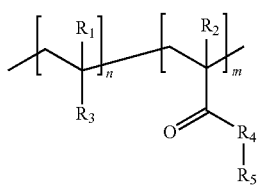

(wherein $R_1$ and $R_2$ are each independently hydrogen or $C_{1-3}$ alkyl, $R_3$ is represented by Formula 2 or 3 below, $R_4$ is O or NH, $R_5$ is benzoylphenyl, wherein the benzoylphenyl is unsubstituted, or substituted with one to four substituents each independently selected from the group consisting of hydroxy, halogen, nitro, $C_{1-5}$ alkyl and $C_{1-5}$ alkoxy, n and m are each independently an integer of 1 or more, and n+m is 100 to 2,000.)

[Formula 2]

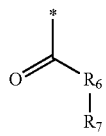

(wherein $R_6$ is O or NH, $R_7$ is H, $C_{1-10}$ alkyl, $C_{1-10}$ aminoalkyl, $C_{1-10}$ fluoroalkyl or

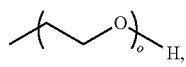

and o is an integer of 1 to 10.)

[Formula 3]

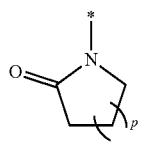

(wherein p is an integer of 1 to 4).

14. The photonic crystal structure according to the above 13, wherein $R_1$ and $R_2$ are each independently hydrogen or methyl, $R_3$ is represented by Formula 2, $R_6$ is NH, and $R_7$ is fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1-fluoropropyl, 2-fluoropropyl, 1,1-difluoropropyl, 1,2-difluoropropyl, 2,2-difluoropropyl, 1,1,2-trifluoropropyl, 1,2,2-trifluoropropyl, 2,2,2-trifluoropropyl, 1-fluorobutyl, 2-fluorobutyl, 1,1-difluorobutyl, 1,2-difluorobutyl, 2,2-difluorobutyl, 1,1,2-trifluorobutyl, 1,2,2-trifluorobutyl or 2,2,2-trifluorobutyl.

15. The photonic crystal structure according to the above 13, wherein the copolymer represented by Formula 1 is one of copolymers including repeating units represented by Formulae 1-1 to 1-10 below:

[Formula 1-1]

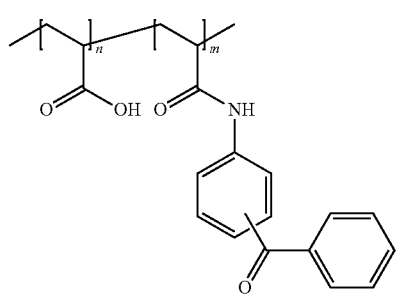

[Formula 1-2]
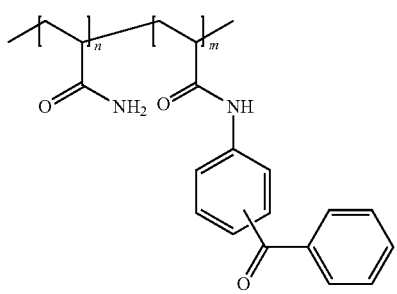

[Formula 1-3]
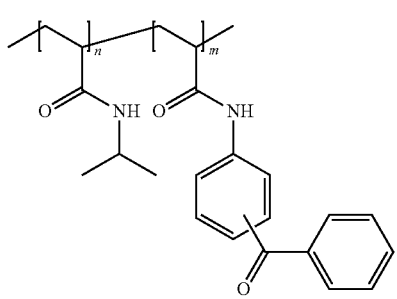

[Formula 1-4]
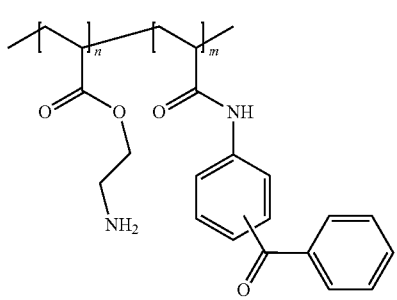

[Formula 1-5]
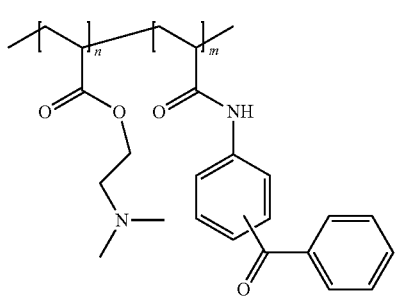

[Formula 1-6]
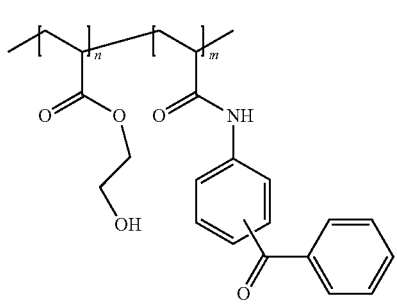

[Formula 1-7]
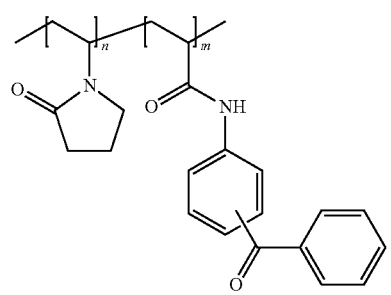

[Formula 1-8]
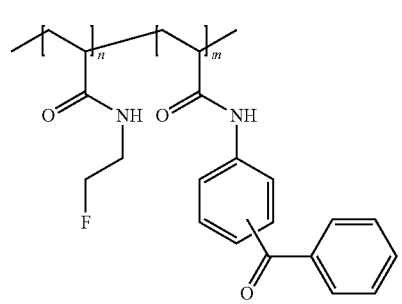

[Formula 1-9]
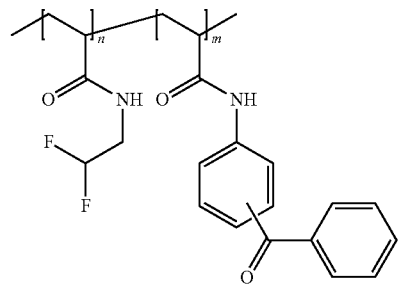

[Formula 1-10]
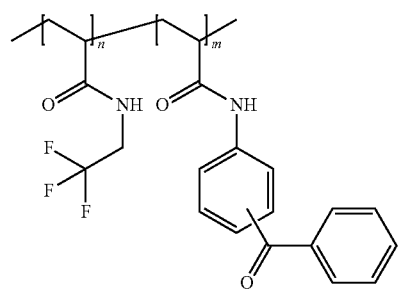

(wherein n and m are each independently an integer of 1 or more, and n+m is 100 to 2,000).

16. The photonic crystal structure according to the above 13, wherein the external stimulus is a relative humidity of 70% or more.

17. The photonic crystal structure according to the above 13, wherein the copolymer including the repeating unit represented by Formula 1 is swelled by the external stimulation, such that a reflection wavelength thereof is shifted.

18. The photonic crystal structure according to the above 13, wherein another of the first polymer and the second polymer is a copolymer including a repeating unit represented by Formula 4 or 5 below:

[Formula 4]

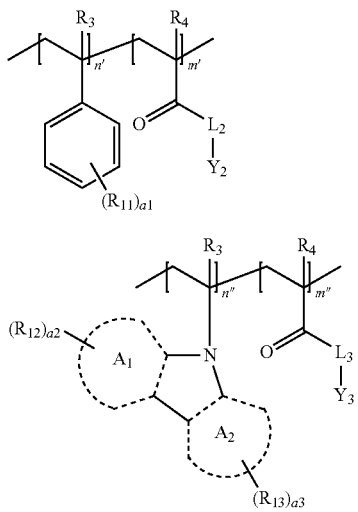

[Formula 5]

[Formula 5-2]

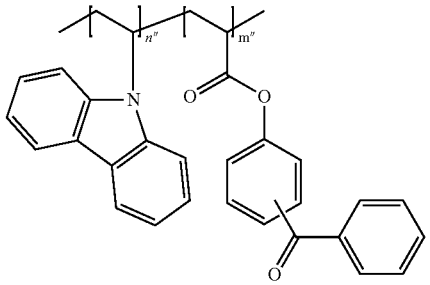

(wherein R$_3$ to R$_6$ are each independently hydrogen or C$_{1-3}$ alkyl,

A$_1$ and A$_2$ are each independently a C$_{6-20}$ aromatic ring or C$_{2-20}$ heteroaromatic ring, R$_{11}$ to R$_{13}$ are each independently hydroxy, cyano, nitro, amino, halogen, SO$_3$H, SO$_3$(C$_{1-5}$ alkyl), C$_{1-10}$ alkyl or C$_{1-10}$ alkoxy, a1 to a3 are each independently an integer of 0 to 5, L$_2$ and L$_3$ are each independently O or NH, Y$_2$ and Y$_3$ are each independently benzoylphenyl, Y$_2$ and Y$_3$ are unsubstituted, or substituted with one to four substituents each independently selected from the group consisting of hydroxy, halogen, nitro, C$_{1-5}$ alkyl and C$_{1-5}$ alkoxy, n' and m' are each independently an integer of 1 or more, n'+m' is 100 to 2,000, n" and m" are each independently an integer of 1 or more, and n"+m" is 100 to 2,000).

19. The photonic crystal structure according to the above 18, wherein R$_3$ to R$_6$ are each independently hydrogen or methyl, A$_1$ and A$_2$ are each independently a benzene ring or naphthalene ring, R$_{11}$ to R$_{13}$ are each independently hydrogen, methyl, ethyl, propyl, isopropyl, butyl, isobutyl, sec-butyl or tert-butyl, and a1 to a3 are each independently 0, 1 or 2.

20. The photonic crystal structure according to the above 18, wherein the copolymer is a copolymer including a repeating unit represented by Formula 5-1 or 5-2 below:

[Formula 5-1]

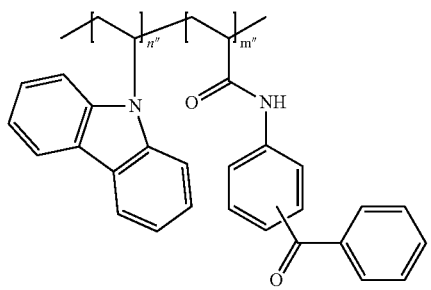

(wherein n" and m" are each independently an integer of 1 or more, and n"+m" is 100 to 2,000).

The anti-forgery color conversion film of the present invention is characterized in that consumers of an article including the color conversion film can easily distinguish the authenticity of the article by using the photonic crystal structure whose color is converted by an external stimulus such as a breath.

DETAILED DESCRIPTION

Figure 1:
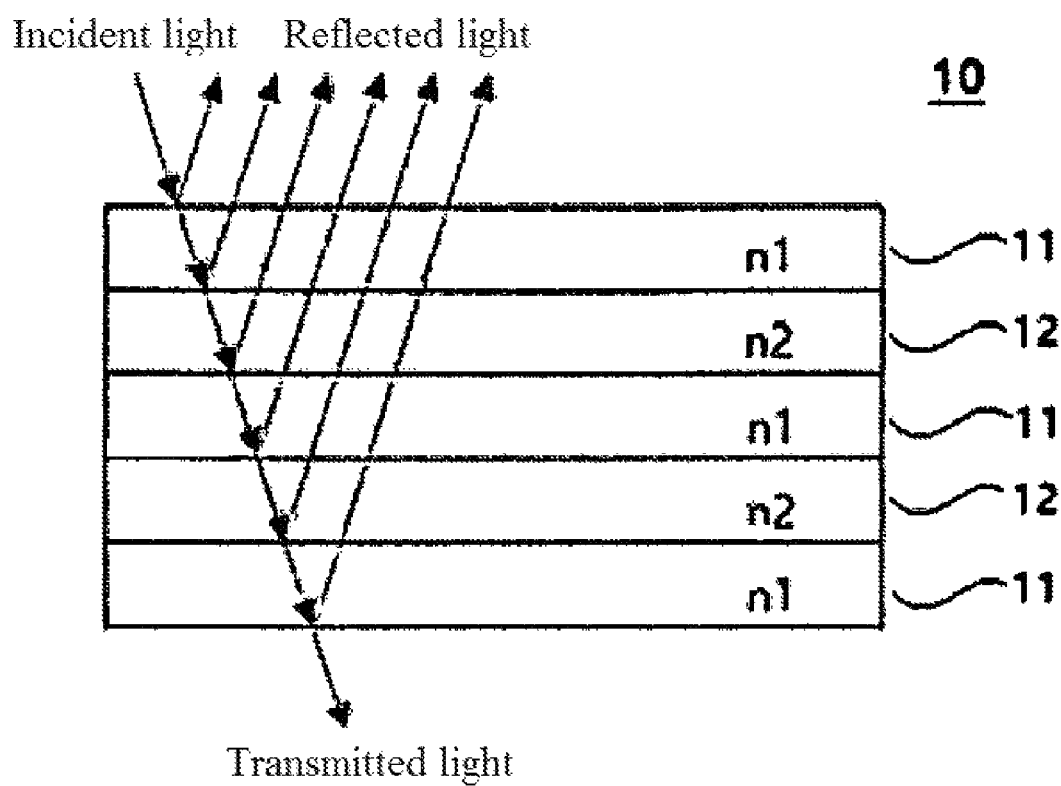
FIG. 1 is a schematic view illustrating a configuration of a photonic crystal structure according to an embodiment of the present invention.

Hereinafter, the present invention will be described in detail.

The term 'photonic crystal' as used herein refers to a structure in which dielectric materials having different refractive indexes from each other are periodically arranged, and means a material in which a superimposed interference occurs between lights scattered at respective regular lattice points, thus to selectively reflect the light without transmitting the same, that is, form a photonic band gap. The above-described photonic crystal is a material which has a high information-processing speed using photons in place of electrons as a means for processing the information, and is implemented in a one-dimensional structure in which the photons move in a direction of a main axis, a two-dimensional structure in which the photons move along a plane, and a three-dimensional structure in which the photons can move freely in all directions throughout the entire material. In addition, the photonic crystal may be applied to optical elements such as a photonic crystal fiber, light emitting device, photovoltaic device, color conversion film, and semiconductor laser by controlling optical characteristics through an adjustment of the photonic band gap thereof.

The term 'photonic crystal structure' as used herein refers to a Bragg stack having a one-dimensional photonic crystal structure manufactured by alternately laminating materials having different refractive indexes, and means a structure in which light of a specific wavelength band can be reflected due to a periodic difference in the refractive index of the laminated structure, and this reflection wavelength is shifted by an external stimulus to convert the reflection color. Specifically, a partial reflection of light occurs at a boundary of the respective layers of the structure, and a large number of these reflected waves can structurally interfere with each other to reflect the light of a specific wavelength having a high intensity. At this time, the shift of the reflection wavelength due to the external stimulus occurs by a change in the wavelength of the scattered light as a lattice structure of the material forming the layers is changed by the external stimulus. The photonic crystal structure may be manufactured in a form of a coating film coated on a separate base film or substrate, or in a form of a free standing film, wherein the optical characteristics thereof can be controlled by adjusting the refractive index and a thickness of the layers.

The anti-forgery color conversion film of the present invention includes a photonic crystal structure whose color is converted by an external stimulus.

The external stimulus that converts the color of the photonic crystal structure may be, for example, a relative humidity of 70% or more. At this time, in the anti-fogging color conversion film including the photonic crystal structure, the color conversion hardly occurs at a relative humidity of less than 70%. Therefore, in a case of an article to which the anti-forgery color conversion film is attached, the color is not converted under a common indoor condition, but the color can be converted when the consumer who purchases the article blows his or her breath on the anti-forgery color conversion film, and thereby allowing the consumer to easily determine the authenticity of the article without using any separate tool or equipment.

Photonic Crystal Structure

The anti-forgery color conversion film according to the present invention includes the photonic crystal structure whose color is converted by an external stimulus.

The film may include one or more photonic crystal structures.

A plurality of photonic crystal structures include each independently a first refractive index layer including a first polymer exhibiting a first refractive index and a second refractive index layer including a second polymer exhibiting a second refractive index which is different from the first refractive index. At this time, one of the first polymer and the second polymer is a copolymer represented by Formula 1 to be described below.

Specifically, when a multi-color white light is incident on the photonic crystal structure according to the present invention, partial reflections of the incident light occur at an interface of the respective layers, and the photonic crystal structure exhibits colors according to a reflection wavelength λ concentrated at one wavelength by an interference between partially reflected lights. The reflection wavelength λ of the photonic crystal structure may be determined by Equation 1 below:

$$\lambda = 2(n1 \times d1 + n2 \times d2)$$ [Equation 1]

Wherein, n1 and n2 denote refractive indexes of the first refractive index layer and the second refractive index layer, respectively, and d1 and d2 denote thicknesses of the first refractive index layer and the second refractive index layer, respectively. Therefore, it is possible to implement a desired reflection wavelength λ by adjusting types of the first and second polymers to be described below, the thicknesses of the first and second refractive index layers, and a total number of the laminated layers of the first and second refractive index layers.

In the above-described photonic crystal structure, the reflection wavelength of the crystal structure is shifted by swelling of the first polymer and/or the second polymer contained in the photonic crystal structure due to the external stimulus. The reason is that, when the first polymer and/or the second polymer is/are swollen, a crystal lattice structure of each refractive index layer is changed, such that a form of light scattered at each layer interface is changed. That is, the photonic crystal structure exhibits the converted color due to the shifted reflection wavelength λ', and the existence of the external stimulus may be confirmed by the color conversion of the photonic crystal structure. In particular, when the reflection wavelength λ and the shifted reflection wavelength λ' of the photonic crystal structure are within a range of 380 nm to 760 nm which is a visible light range, the color conversion of the photonic crystal structure may be easily confirmed visually.

Specifically, the color conversion of the photonic crystal structure may be caused by the reflection wavelength of the photonic crystal structure which is shifted by the swelling of the copolymer including a repeating unit represented by Formula 1 to be described below due to the external stimulus, for example, a relative humidity of 70% or more.

The reason why the photonic crystal structure according to the present invention has no or little color conversion at a relative humidity of less than 70% is due to the inherent hydrophilic properties thereof. The above-described hydrophilic properties may be implemented by changing a composition of a monomer contained in the photonic crystal structure.

Hereinafter, a schematic configuration of a photonic crystal structure 10 included in a color conversion film according to an embodiment of the present invention will be described with reference to FIG. 1.

Referring to FIG. 1, the photonic crystal structure 10 according to the embodiment of the present invention includes a first refractive index layer 11 and a second refractive index layer 12 which are alternately laminated with each other.

At this time, the first refractive index layer 11 may be located at a topmost portion of the photonic crystal structure. Accordingly, another first refractive index layer 11 may be further laminated on a laminate in which the first refractive index layer 11 and the second refractive index layer 12 are alternately laminated, such that the photonic crystal structure may have an odd number of refractive index layers. In this case, as described above, a constructive interference between the lights reflected at the interface of the respective layers is increased, such that the intensity of the reflected wavelength of the photonic crystal structure may be increased.

The first refractive index layer 11 includes a first polymer exhibiting a first refractive index n1 and the second refractive index layer 12 includes a second polymer exhibiting a second refractive index n2.

The first refractive index n1 and the second refractive index n2 may be different from each other. The difference therebetween may be, for example, 0.01 to 0.5. Specifically, the difference therebetween may be 0.05 to 0.3, and more specifically 0.1 to 0.2. As the difference between the refractive indexes is increased, a photonic band gap of the photonic crystal structure is increased. Therefore, it is possible to control so as to reflect light having a desired wavelength by adjusting the difference between the refractive indexes within the above-described range, and the refractive index may be adjusted by changing the type of the polymer to be described below.

The specific refractive index is not particularly limited. For example, the first refractive index n1 may be 1.51 to 1.8, and the second refractive index n2 may be 1.3 to 1.6. In other words, the first refractive index layer 11 corresponds to a high refractive index layer, and the second refractive index layer 12 corresponds to a low refractive index layer, such that the photonic crystal structure 10 may have a configuration in which the high refractive index layer/the low refractive index layer/the high refractive index layer/the low refractive index layer/the high refractive index layer are laminated in this order.

In addition, the first refractive index n1 may be 1.3 to 1.6, and the second refractive index n2 may be 1.51 to 1.8. In other words, the first refractive index layer 11 corresponds to a low refractive index layer, the second refractive index layer 12 corresponds to a high refractive index layer, such that the photonic crystal structure 10 may have a configuration in which the low refractive index layer/the high refractive index layer/the low refractive index layer/the high refractive index layer/the low refractive index layer are laminated in this order.

More specifically, the first refractive index layer 11 of the photonic crystal structure 10 may be a high refractive index layer including a first polymer having a first refractive index of 1.51 to 1.8 and a thickness of 50 to 150 nm, and the second refractive index layer 15 may be a low refractive index layer including a second polymer having a second refractive index of 1.3 to 1.6 and a thickness of 100 to 100 nm.

By adjusting the thickness within the above-described range, the reflection wavelength of the photonic crystal structure may be controlled. The thickness of each refractive index layer may be controlled by varying a concentration of the polymer in a polymer dispersion composition or an applying rate of the dispersion composition.

In addition, FIG. 1 illustrates only one photonic crystal structure 10 having five layers in total, but the total number of the laminated layers in the photonic crystal structure is not limited thereto, and the anti-forgery color conversion film includes a plurality of the above-described photonic crystal structures.

Specifically, the total number of the laminated layers of the first refractive index layer and the second refractive index layer may be 5 to 30. When the structure has the number of layers laminated within the above-described range, an interference between the lights reflected at the interface of the respective layers may sufficiently occur, such that the lights may have a reflection intensity enough to detect a color conversion due to the external stimulation. The plurality of photonic crystal structures may have a total number of the laminated layers of the first refractive index layer and the second refractive index layer which are different from each other.

Low Refractive Index Layer of the Photonic Crystal Structure

The polymer contained in the low refractive index layer having a relatively low refractive index of the two types of layers included in the photonic crystal structure according to the present invention is a copolymer having a repeating unit represented by Formula 1 below as one of the first polymer and the second polymer:

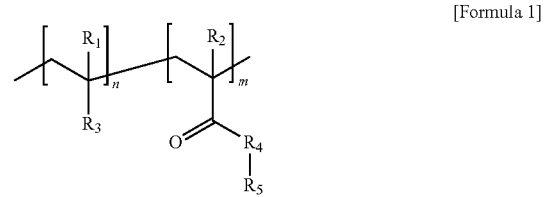

[Formula 1]

(wherein $R_1$ and $R_2$ are each independently hydrogen or $C_{1-3}$ alkyl, $R_3$ is represented by Formula 2 or 3 below, $R_4$ is O or NH, $R_5$ is benzoylphenyl, wherein the benzoylphenyl is unsubstituted, or substituted with one to four substituents each independently selected from the group consisting of hydroxy, halogen, nitro, $C_{1-5}$ alkyl and $C_{1-5}$ alkoxy, n and m are each independently an integer of 1 or more, and n+m is 100 to 2,000.)

[Formula 2]

(wherein $R_6$ is O or NH, $R_7$ is H, $C_{1-10}$ alkyl, $C_{1-10}$ aminoalkyl, $C_{1-10}$ fluoroalkyl or

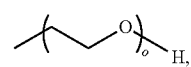

and o is an integer of 1 to 10.)

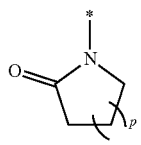

[Formula 3]

(wherein p is an integer of 1 to 4).

By including the copolymer represented by Formula 1, the inventive film has a low refractive index, excellent chemical properties such as thermal stability, chemical resistance and oxidation stability, and excellent transparency.

The copolymer including the repeating unit represented by Formula 1 according to the present invention may be a copolymer which is prepared by randomly copolymerizing an acrylate or acrylamide monomer represented by Formula 2 or 3 and an acrylate or acrylamide monomer having a photoactive functional group $R_5$, wherein the repeating units between square brackets of Formula 1 are randomly arranged with each other.

The copolymer including the repeating unit represented by Formula 1 according to the present invention may be a block copolymer in which blocks of the repeating units between the square brackets of the above Formula 1 are connected by a covalent bond. In addition, the copolymer may be an alternating copolymer in which the repeating units between the square brackets in the above Formula 1 are alternately arranged, or a graft copolymer in which any one repeating unit is bonded in a branched form, but the arrangement form of the repeating units is not limited thereto.

The copolymer represented by Formula 1 according to the present invention may exhibit a refractive index in a range of 1.3 to 1.6, for example. Within the above-described range, it is possible to implement a photonic crystal structure that reflects light having a desired wavelength by a difference in the refractive index between the above copolymer and a polymer used in a high refractive index layer to be described below.

In Formula 1, $R_1$ and $R_2$ may be each independently hydrogen or methyl. For example, $R_1$ and $R_2$ may be hydrogen.

In Formula 1, $R_5$ may be benzoylphenyl which is unsubstituted, or substituted with $C_{1-3}$ alkyl. When $R_5$ is benzoylphenyl, it may be advantageous in terms of easiness in photo-curing.

According to one embodiment, in Formula 1, $R_3$ may be represented by Formula 2, and $R_6$ may be NH.

In Formula 1, $R_7$ may be $C_{1-5}$ fluoroalkyl.

Herein, 'fluoroalkyl' means a functional group in which hydrogen atoms of alkyl are substituted with one or more fluorine atoms, wherein the hydrogen atoms present at a side chain as well as a terminal of $C_{1-10}$ alkyl may be substituted with one or more fluorine atoms, and two or more fluorine atoms may be bonded to one carbon atom, or may be bonded to two or more carbon atoms, respectively.

$C_{1-5}$ fluoroalkyl may be fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1-fluoropropyl, 2-fluoropropyl, 1,1-difluoropropyl, 1,2-difluoropropyl, 2,2-difluoropropyl, 1,1,2-trifluoropropyl, 1,2,2-trifluoropropyl, 2,2,2-trifluoropropyl, 1-fluorobutyl, 2-fluorobutyl, 1,1-difluorobutyl, 1,2-difluorobutyl, 2,2-difluorobutyl, 1,1,2-trifluorobutyl, 1,2,2-trifluorobutyl or 2,2,2-trifluorobutyl.

As the number of fluorine atoms in the copolymer represented by the above Formula 1 is increased, the refractive index is further reduced and hydrophobic properties may be increased. Thus, it is possible to implement a photonic crystal structure having a desired reflection wavelength by adjusting a difference in the refractive index between the high refractive index layer and the low refractive index layer according to the number of fluorine atoms.

In Formula 1, n denotes a total number of the repeating units derived from a fluoroalkyl acrylamide monomer in the copolymer, and m denotes a total number of the repeating units derived from an acrylate or acrylamide monomer having a photoactive functional group $R_5$ in the copolymer.

Herein, the copolymer including the repeating unit represented by the above Formula 1 may have a molar ratio of n:m of 100:1 to 100:50, and a number average molecular weight of 10,000 to 100,000 g/mol. For example, the copolymer including the repeating unit represented by the above Formula 1 may have a molar ratio of n:m of 100:1 to 100:40, and specifically 100:20 to 100:35. For example, the copolymer including the repeating unit represented by the above Formula 1 may have a number average molecular weight of 10,000 to 80,000 g/mol. Within the above-described range, it is possible to prepare a copolymer that can be easily photo-cured while having a low refractive index.

Specifically, the copolymer including the repeating unit represented by the above Formula 1 may be one of copolymers including repeating units represented by Formulae 1-1 to 1-10 below:

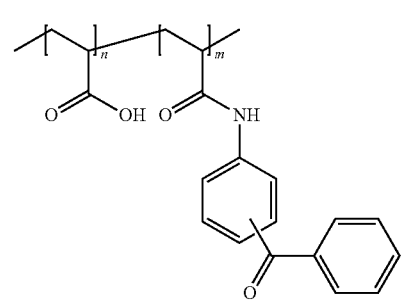

[Formula 1-1]

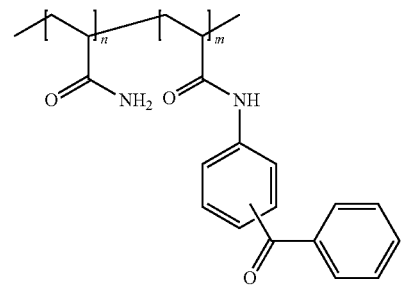

[Formula 1-2]

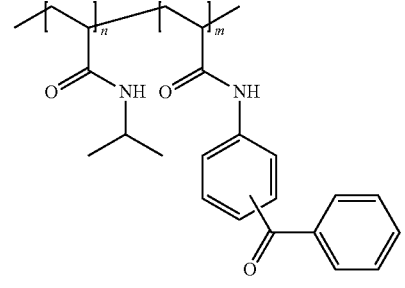

[Formula 1-3]

-continued

[Formula 1-4]
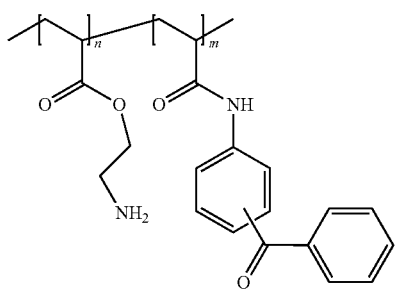

[Formula 1-5]
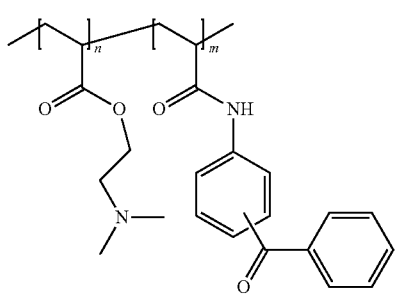

[Formula 1-6]
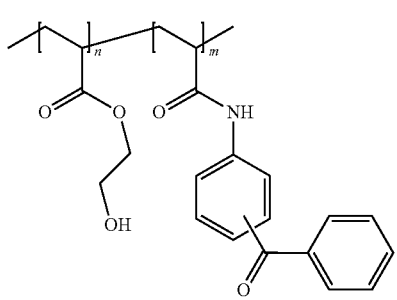

[Formula 1-7]
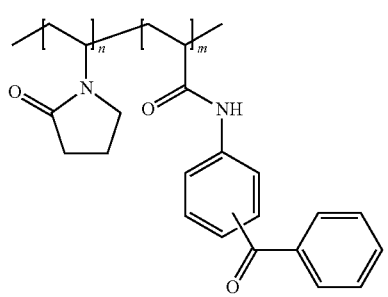

[Formula 1-8]
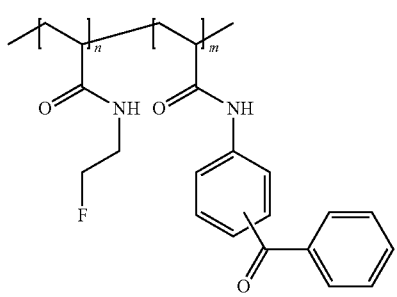

[Formula 1-9]
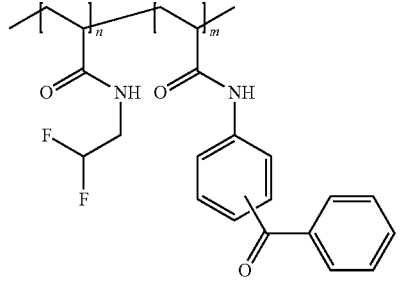

[Formula 1-10]
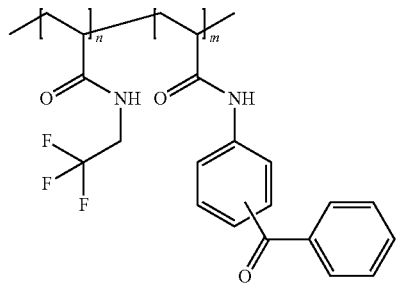

(wherein n and m are the same as defined in connection with Formula 1).

High Refractive Index Layer of the Photonic Crystal Structure

The polymer contained in the high refractive index layer, which is a layer having a relatively high refractive index of two types of layers included in the photonic crystal structure according to the present invention, is not the copolymer represented by Formula 1, but is another of the first polymer and the second polymer, and exhibits a higher refractive index than the copolymer represented by Formula 1 by including a repeating unit derived from the following monomers: a (meth)acrylate compound, (meth)acrylamide compound, vinyl group-containing aromatic compound, dicarboxylic acid, xylylene, alkylene oxide, arylene oxide, and derivatives thereof. These substances may be used alone or in combination of two or more thereof.

For example, the polymer contained in the high refractive index layer may include one or more repeating units derived from the following monomers: (meth)acrylate monomers such as methyl (meth)acrylate, ethyl (meth)acrylate, isobutyl (meth)acrylate, 1-phenylethyl (meth)acrylate, 2-phenylethyl (meth)acrylate, 1,2-diphenylethyl (meth) acrylate, phenyl (meth) acrylate, benzyl (meth)acrylate, m-nitrobenzyl (meth)acrylate, β-naphthyl (meth) acrylate, benzoylphenyl (meth) acrylate, etc.; (meth)acrylamide monomers such as methyl (meth)acrylamide, ethyl (meth) acrylamide, isobutyl (meth) acrylamide, 1-phenylethyl (meth) acrylamide, 2-phenylethyl (meth) acrylamide, phenyl (meth) acrylamide, benzyl (meth) acrylamide, benzoylphenyl (meth) acrylamide, etc.; styrene monomers such as styrene, o-methylstyrene, m-methylstyrene, p-methylstyrene, p-methoxystyrene, o-methoxystyrene, 4-methoxy-2-methylstyrene, etc.; aromatic monomers such as p-divinylbenzene, 2-vinylnaphthalene, vinylcarbazole, vinylfluorene, etc.; dicarboxylic acid monomer such as terephthalic acid, isophthalic acid, 2,6-naphthalene dicarboxylic acid, 2,7-naphthalene dicarboxylic acid, 1,4-naphthalene dicarboxylic acid, 1,4-phenylene dioxyphenylenic acid, 1,3-phenylene dioxydiacetic acid, etc.; xylylene monomers such as o-xylylene, m-xylylene, p-xylylene etc.; alkylene oxide monomers such as ethylene oxide, propylene oxide etc.; phenylene oxide monomers such as phenylene oxide, 2,6-dimethyl-1,4-phenylene oxide, etc. Among them, it is preferable to have a repeating unit derived from the styrene monomer, and a repeating unit derived from one of (meth)acrylate and (meth)acrylamide in terms of implementing a desired difference in the refractive index and easiness in photo-curing.

Specifically, another of the first polymer and the second polymer, which is not the copolymer represented by Formula 1 used in the high refractive index layer, may be a copolymer including a repeating unit represented by Formula 4 or 5 below:

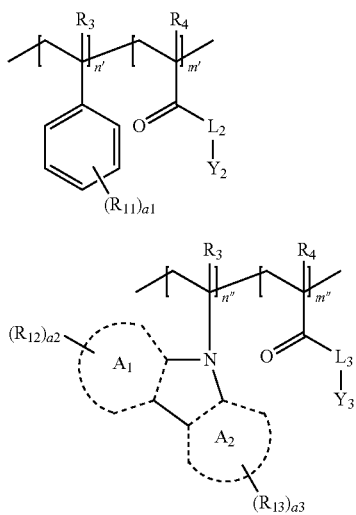

[Formula 4]

[Formula 5]

(wherein $R_3$ to $R_6$ are each independently hydrogen or $C_{1-3}$ alkyl, $A_1$ and $A_2$ are each independently a $C_{6-20}$ aromatic ring or $C_{2-20}$ heteroaromatic ring, $R_{11}$ to $R_{13}$ are each independently hydroxy, cyano, nitro, amino, halogen, $SO_3H$, $SO_3(C_{1-5}$ alkyl), $C_{1-10}$ alkyl or $C_{1-10}$ alkoxy, a1 to a3 are each independently an integer of 0 to 5, $L_2$ and $L_3$ are each independently O or NH, $Y_2$ and $Y_3$ are each independently benzoylphenyl, $Y_2$ and $Y_3$ are unsubstituted, or substituted with one to four substituents each independently selected from the group consisting of hydroxy, halogen, nitro, $C_{1-5}$ alkyl and $C_{1-5}$ alkoxy, n' and m' are each independently an integer of 1 or more, n'+m' is 100 to 2,000, n" and m" are each independently an integer of 1 or more, and n"+m" is 100 to 2,000).

The copolymer including the repeating unit represented by Formula 4 may mean a polymer including both of a repeating unit derived from a styrene monomer and a repeating unit derived from an acrylate ($L_2$=O) or acrylamide ($L_2$=NH) monomer having a photoactive functional group ($Y_2$). In addition, the copolymer represented by the above Formula 5 may mean a polymer including both of a repeating unit derived from a carbazole monomer and a repeating unit derived from an acrylate ($L_3$=O) or acrylamide ($L_3$=NH) monomer having a photoactive functional group ($Y_3$).

When the copolymer including the repeating unit represented by Formula 4 or 5 includes the repeating unit derived from the styrene monomer and the repeating unit derived from the carbazole monomer, respectively, the copolymer may have a high refractive index, thus to implement a high refractive index layer.

Furthermore, the copolymer including the repeating unit represented by the above Formula 4 or 5 may further include a repeating unit derived from an acrylate or acrylamide monomer having photoactive functional groups ($Y_2$ and $Y_3$), thus to perform photo-curing by itself without a separate photo-initiator or cross-linking agent.

The copolymer including the repeating unit represented by the above Formula 4 may be a copolymer which is prepared by randomly copolymerizing a styrene monomer and an acrylate or acrylamide monomer having a photoactive functional group ($Y_2$), wherein the repeating units between square brackets of the above Formula 4 are randomly arranged with each other.

Alternatively, the copolymer including the repeating unit represented by the above Formula 4 may be a block copolymer in which blocks of the repeating units between the square brackets of the above Formula 4 are connected by a covalent bond. Or otherwise, the copolymer may be an alternating copolymer in which the repeating units between the square brackets in the above Formula 4 are alternately arranged, or a graft copolymer in which any one repeating unit is bonded in a branched form, but the arrangement form of the repeating units is not limited thereto.

Alternatively, the copolymer including the repeating unit represented by the above Formula 5 may be a block copolymer in which blocks of the repeating units between the square brackets of the above Formula 5 are connected by a covalent bond. Or alternatively, the copolymer may be an alternating copolymer in which the repeating units between the square brackets in the above Formula 5 are alternately arranged, or a graft copolymer in which any one repeating unit is bonded in a branched form, but the arrangement form of the repeating units is not limited thereto.

The copolymer including the repeating unit represented by the above Formula 4 or 5 may exhibit a refractive index of 1.51 to 1.8. Within the above-described range, it is possible to implement a photonic crystal structure which reflects light having a desired wavelength due to a difference in the refractive index between the above copolymer and the polymer including the repeating unit represented by the above Formula 1.

In Formula 4 or 5, $R_3$ to $R_6$ may be each independently hydrogen or methyl. For example, $R_3$ to $R_6$ may be hydrogen.

In Formula 5, $A_1$ and $A_2$ may be each independently a benzene ring or naphthalene ring. For example, $A_1$ and $A_2$ may be each independently a benzene ring.

In Formula 4 or 5, $R_{11}$ to $R_{13}$ may be each independently hydrogen, methyl, ethyl, propyl, isopropyl, butyl, isobutyl, sec-butyl or tert-butyl. At this time, a1 denotes the number of $R_{11}$, which may be 0, 1 or 2, and when a1 is 2 or more, $R_{11}$ of two or more may be the same as or different from each other. a2 and a3 may also be understood with reference to the description in connection with a1 and the structures of Formulae 2 and 3, and may be 0, 1 or 2.

In Formula 4 or 5, $Y_2$ and $Y_3$ may be each independently benzoylphenyl unsubstituted, or substituted with $C_{1-3}$ alkyl. When $Y_2$ and $Y_3$ are benzoylphenyl, it is advantageous in terms of easiness in photo-curing.

In Formula 4, n' denotes a total number of the repeating units derived from the styrene monomer in the copolymer, and m' denotes a total number of the repeating units derived from the acrylate or acrylamide monomer having a photoactive functional group in the copolymer.

The copolymer including the repeating unit represented by Formula 4 according to the present invention may have a molar ratio of n':m' of 100:1 to 100:50, for example, 100:30 to 100:50. In addition, the copolymer including the repeating unit represented by the above Formula 4 may have a number average molecular weight (Mn) of 10,000 to 100,000 g/mol, for example, 10,000 to 50,000 g/mol. Within the above-described range, it is possible to prepare a copolymer including the repeating unit represented by the above Formula 1 and a copolymer that can be easily photo-cured, while having a difference in the refractive index within the above-described range.

Specifically, the copolymer including the repeating unit represented by Formula 4 according to the present invention may be a copolymer including a repeating unit represented by Formula 4-1 below:

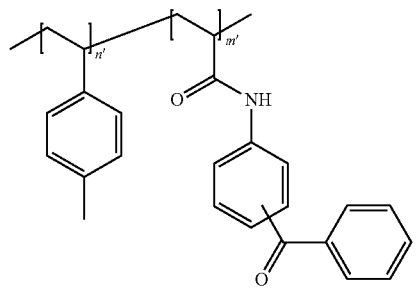

[Formula 4-1]

(wherein n' and m' are the same as defined in connection with Formula 4).

In Formula 5, n" denotes a total number of the repeating units derived from the carbazole monomer in the copolymer, and m" denotes a total number of the repeating units derived from the acrylate or acrylamide monomer having a photoactive functional group in the copolymer.

The copolymer including the repeating unit represented by Formula 5 according to the present invention may have a molar ratio of n":m" of 100:1 to 100:50, for example, 100:1 to 100:40. In addition, the copolymer including the repeating unit represented by Formula 5 may have a number average molecular weight (Mn) of 10,000 to 500,000 g/mol, for example, 10,000 to 350,000 g/mol. Within the above-described range, it is possible to prepare a copolymer including the repeating unit represented by the above Formula 1 and a copolymer that can be easily photo-cured, while having a difference in the refractive index within the above-described range.

Specifically, the copolymer including the repeating unit represented by the above Formula 5 may be a copolymer including a repeating unit represented by Formula 5-1 or 5-2 below:

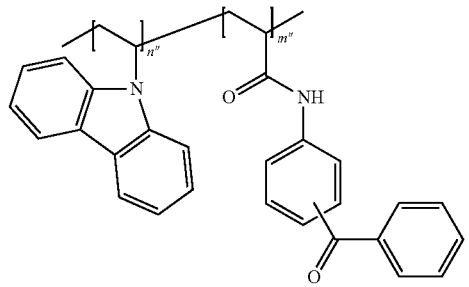

[Formula 5-1]

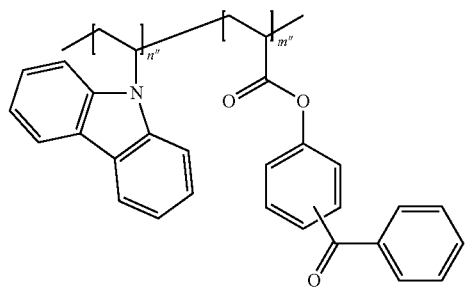

[Formula 5-2]

(wherein n" and m" are the same as defined in connection with Formula 5).

The photonic crystal structure according to the present invention as described above may be manufactured by a manufacturing method including, for example, the following steps of:

1) forming a first refractive index layer using a first dispersion composition including a first polymer exhibiting a first refractive index; and 2) forming a second refractive index layer on the first refractive index layer using a second dispersion composition including a second polymer exhibiting a second refractive index.

In the manufacturing method of the photonic crystal structure, the descriptions of the first refractive index, the first polymer, the second refractive index, the second polymer, the first refractive index layer and the second refractive index layer are the same as described in connection with FIG. 1.

First, a first dispersion composition and a second dispersion composition are prepared. Each dispersion composition may be prepared by dispersing a polymer in a solvent. Herein, the dispersion composition is used as a term to indicate various states such as a solution phase, slurry phase or paste phase. At this time, the solvent may use any solvent so long as it can dissolve the first and second polymers, and the first and second polymers may be each included in an amount of 0.5 to 20% by weight based on the total weight of the dispersion composition. Within the above-described range, it is possible to prepare a dispersion composition having a viscosity suitable for being applied to a substrate.

For example, the first dispersion composition may include a solvent and a first polymer, and the second dispersion composition may include a solvent and a second polymer. In other words, these dispersion compositions may not include a separate photo-initiator and cross-linking agent for photo-curing, or inorganic particles. Therefore, the photonic crystal structure may be more easily and economically manufactured, and a deviation in optical characteristics according to positions of the manufactured photonic crystal structure may be reduced because the dispersion compositions do not include a separate additive.

Next, the prepared first dispersion composition is applied to the substrate or a base film, and then light irradiation is performed to form a first refractive index layer. Thereafter, the prepared second dispersion composition is applied to the first refractive index layer, and then light irradiation is performed to form a second refractive index layer.

Herein, a method of applying the dispersion composition to the substrate or the refractive index layer may use methods such as spin coating, dip coating, roll coating, screen coating, spray coating, spin casting, flow coating, screen printing, ink jet, drop casting, or the like, but it is not limited thereto.

The light irradiation step may be performed by irradiating the substrate with a light having a wavelength of 365 nm under a nitrogen condition. A benzophenone moiety contained in the polymer may function as a photo-initiator by the light irradiation, thus to fabricate a photo-cured refractive index layer.

If necessary, the first refractive index layer and the second refractive index layer may be further alternately laminated, and a photonic crystal structure in which, for example, 3 to 30 layers are laminated may be manufactured.

Anti-Forgery Color Conversion Film

The anti-forgery color conversion film according to the present invention may include one or a plurality of the above-described photonic crystal structures. For example, the color conversion film may include two or more, or two to 100 photonic crystal structures described above, but the number is not limited thereto. Considering the easiness in manufacturing and a functional aspect as an identification indicator, 3 to 20 photonic crystal structures are preferable.

In the plurality of photonic crystal structures, the types of the first and second polymers, the thicknesses of the first and second refractive index layers, and/or the total number of the laminated layers of the first refractive index layer and the second refractive index layer may be each independently the same as or different from each other.

For example, in the plurality of photonic crystal structures, the total number of the laminated layers of the first refractive index layer and the second refractive index layer may be different from each other.

Accordingly, the plurality of photonic crystal structures may be converted into different colors from each other by the external stimulus. Therefore, in a case of the anti-forgery color conversion film including the plurality of photonic crystal structures, the film may be converted into various colors by the external stimulus, such that forgery and alteration are impossible, and consumers may have a pleasure to view the film in various colors.

In addition, the color conversion film of the present invention may further include a substrate for fixing the photonic crystal structure. The substrate may be a carbon material, metal foil, thin glass, or plastic substrate, which has excellent mechanical strength, thermal stability, transparency, surface smoothness, easiness in handling, and waterproofness, without particular limitation thereof, and may be a substrate using various materials which have flexibility or have no flexibility.

In addition, the color conversion film of the present invention may further include an adhesive part on a lower side of the substrate, specifically, on a surface facing an article to which the color conversion film is to be attached. The adhesive part may include an adhesive commonly used in the art depending on types of the article.

Since the photonic crystal structure according to the present invention has a thin film form and may be manufactured in various sizes and shapes, the color conversion film including the same may be manufactured in various sizes and forms depending on the intended use.

When an external stimulus such as a breath is applied to the above-described photonic crystal structure according to the present invention, it is possible to promptly confirm the authenticity of the article.

Further, the color conversion film of the present invention may be repeatedly and continuously used.

Specifically, the photonic crystal structure in the color conversion film of the present invention may be re-used repeatedly since the color thereof is restored to the original color after a predetermined time elapses even after one use. Therefore, regardless of time or step of the distribution route, a plurality of consumers may use the structure to discriminate the authenticity of the article, thus it is environmentally friendly and economical.

The anti-forgery color conversion film of the present invention as described above may be fabricated by a manufacturing method including, without particular limitation thereof, the following steps of:

1) applying a first dispersion composition including a first polymer exhibiting a first refractive index to a substrate, and then light irradiation is performed thereon in a state in which mask patterns having a plurality of predetermined shapes are positioned to form a plurality of first refractive index layers, followed by removing the mask patterns; and 2) applying a second dispersion composition including a second polymer exhibiting a second refractive index to the first refractive index layer, and then light irradiation is performed thereon in a state in which the mask patterns having a plurality of predetermined shapes are positioned to form a plurality of second refractive index layers, followed by removing the mask patterns.

The above steps 1) and 2) may be repeated as necessary to fabricate a color conversion film including a plurality of photonic crystal structures having a predetermined shape, in which 3 to 30 layers are laminated, for example.

At this time, when repeating the above steps 1) and 2) in the above 3) in order to allow the plurality of photonic crystal structures to exhibit different colors from each other, the light irradiation may also be performed by positioning the mask pattern except for some shapes of the mask patterns.

Further, the present invention provides an article including the above-described anti-forgery color conversion film.

Specifically, the article may be a subject article to be protected from the forgery and alteration in order to protect the brand, and may be, for example, medicines, toys, cosmetics, tobacco, alcoholic drinks, clothing, food, sports goods, shoes, parts of an automobile, credit cards, gift cards, and the like, but it is not limited thereto.

Hereinafter, the present invention will be described in detail with reference to examples.

Material

The following materials were used in Preparative Examples below. At this time, each material was used without a separate purification process.

4-aminobenzophenone: A product having a purity of 98% manufactured by Tokyo Chemical Industry (TCI) was used.
  Triethylamine: A product having a purity of 99% manufactured by Tokyo Chemical Industry (TCI) was used.
  Dichloromethane: A product having a purity of 99.9% manufactured by Burdick & Jackson was used.

Acryloyl chloride: A product having a purity of 96% manufactured by Merck was used.

Tetrahydrofuran: A product having a purity of 99.9% manufactured by Burdick & Jackson was used.

p-methylstyrene: A product having a purity of 96% manufactured by Sigma-Aldrich was used.

Azobisisobutyronitrile: A product having a purity of 98% manufactured by JUNSEI was used.

N-isopropyl acrylamide: A product having a purity of 98% manufactured by Tokyo Chemical Industry (TCI) was used.

Acrylic Acid: A product having a purity of 99% manufactured by Sigma-Aldrich was used.

Monomer and Copolymer

Names and abbreviations of the monomers and copolymers prepared in the following Preparative Examples are shown in Table 1 below.

TABLE 1

| Section | Name | Abbreviation |
| --- | --- | --- |
| Preparative Example A | N-(4-benzoylphenyl)acrylamide | BPAA |
| Preparative Example B | 4-benzoylphenyl acrylate | BPA |
| Preparative Example C | N-(2-fluoroethyl)acrylamide | FEAA |
| Preparative Example 1 | poly(Vinylpyrrolidone)-co-poly(N-(benzoylphenyl)acrylamide) | Poly(VP-BPAA) |
| Preparative Example 2 | poly(Acrylic acid)-co-poly(N-(benzoylphenyl)acrylamide) | Poly(AA-BPAA) |
| Preparative Example 3 | poly(9-vinylcarbazole)-co-4-benzoylphenylacrylate | Poly(VC-BPA) |
| Preparative Example 4 | poly(para-methylstyrene)-co-(N-(4-benzoylphenyl)acrylamide) | Poly(p-MS-BPAA) |
| Preparative Example 5 | poly(N-(2-fluoroethyl)acrylamide)-co-N-(4-benzoylphenyl)acrylamide) | Poly(FEM-BPAA) |

PREPARATIVE EXAMPLE

Synthesis of Monomer

Preparative Example A: Preparation of BPAA

After introducing 9.86 g of 4-aminobenzophenone, 15 mL of triethylamine, and 80 mL of dichloromethane into a 250 mL round bottom flask, the flask was placed in ice water. 4.06 mL of acryloyl chloride was added to the flask, and then the mixture was stirred for 12 hours.

After completion of the reaction, the solvent was removed, followed by drying in a vacuum oven to obtain N-(4-benzoylphenyl)acrylamide as a yellow solid.

Preparative Example B: Preparation of BPA

After introducing 10 g of 4-hydroxybenzophenone, 20 mL of triethylamine, and 120 mL of dichloromethane into a 250 mL round bottom flask, the flask was placed in ice water. 4.92 mL of acryloyl chloride was added to the flask, and then the mixture was stirred for 12 hours. After completion of the reaction, the solvent was removed, followed by drying in a vacuum oven to obtain N-(4-benzoylphenyl)acrylate as a yellow solid.

Preparative Example C: Preparation of FEAA

After introducing 10 g of 2-fluoroethylamine and 12 mL of triethylamine into a round bottom flask, the flask was placed in ice water. 7.7 mL of acryloyl chloride was slowly added dropwise to the flask while stirring. When all the solution is added, the mixture was stirred at room temperature for 12 hours. After completion of the reaction, the solvent was removed using a rotary evaporator to obtain pure N-(2-fluoroethyl)acrylamide as a yellow liquid.

Synthesis of Copolymer

Preparative Example 1: Preparation of poly(VP-BPAA)

After introducing 25 mL of vinyl pyrrolidone, 5 g of N-(4-benzoylphenyl)acrylamide, 0.1 g of AIBN, and 15 mL of 1,4-dioxane into a 50 mL schlenk flask, the mixture was stirred with a magnetic bar so as to admix all the substances. Further, the mixture was stirred in an oil bath at 50° C. for 4 hours. After completion of the reaction, the polymer was extracted, followed by drying in a vacuum oven to obtain poly(VC-BPAA) (n:m=100:30).

Preparative Example 2: Preparation of Poly(AA-BPAA)

After introducing 25 mL of acrylic acid, 5 g of N-(4-benzoylphenyl)acrylamide, 0.1 g of AIBN, and 25 mL of 1,4-dioxane into a 50 mL schlenk flask, the mixture was stirred with a magnetic bar so as to admix all the substances. Further, the mixture was stirred in an oil bath at 50° C. for 3 hours. After completion of the reaction, the polymer was extracted, followed by drying in a vacuum oven to obtain poly(AA-BPAA) (n:m=100:35).

Preparative Example 3: Preparation of Poly(VC-BPA)

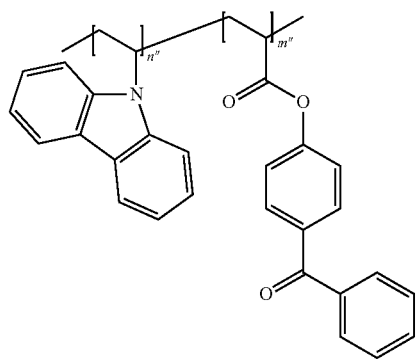

After introducing 3 g of 9-vinyl carbazole, 1 g of BPA prepared in Preparative Example B, and 0.1 g of azobisisobutyronitrile into a 25 ml round bottom flask, the mixture was stirred. A reaction was carried out for 15 hours. After completion of the reaction, the polymer was filtered to extract the polymer, followed by drying in a vacuum oven at room temperature to obtain poly(VC-BPAA) (n":m"=100: 40).

Preparative Example 4: Preparation of Poly(p-MS-BPAA)

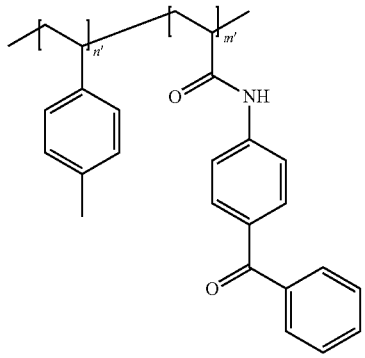

After introducing 3 ml of para-methylstyrene, 0.6 g of BPAA prepared in Preparative Example A, and 0.0046 g of azobisisobutyronitrile into a 25 ml schlenk round bottom flask, the mixture was stirred for 15 hours. After completion of the reaction, the polymer was extracted, followed by drying in a vacuum oven at room temperature to obtain poly(p-MS-BPAA) (n':m'=100:40).

Preparative Example 5: Preparation of Poly(FEAA-BPAA)

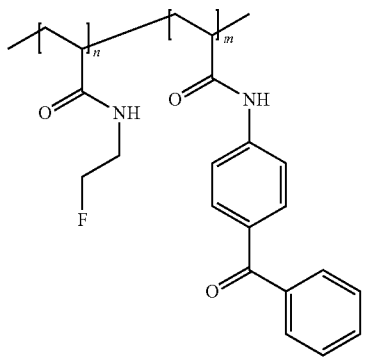

After introducing 0.82 g of FEAA prepared in Preparative Example C, 0.32 g of BPAA prepared in Preparative Example A, and 0.0023 g of azobisisobutyronitrile into a 25 ml schlenk round flask, the mixture was stirred. A reaction was carried out for 15 hours. After completion of the reaction, the polymer was filtered to extract the polymer, followed by drying in a vacuum oven at room temperature to obtain poly(FEAA-BPAA) (n:m=100:30).

Experimental Example 1: Measurement of Physical Properties of Copolymer

Specific physical properties of the copolymers prepared in Preparative Examples 1 to 5 were measured by the following methods, and results thereof are shown in Table 2 below.

TABLE 2

| Section | Mn (g/mol) | PDI | Tg | BPAA CONTENT (%) | Refractive index |
|---|---|---|---|---|---|
| Preparative Example 1 | 15,000 | 1.49 | 182.63 | 5.5 | 1.544 |
| Preparative Example 2 | 86,000 | 1.18 | 219.08 | 9.42 | 1.536 |
| Preparative Example 3 | 83,000 | 2.28 | 211.47 | — | 1.636 |
| Preparative Example 4 | 22,400 | 1.72 | 113° C. | 15% | 1.587 |
| Preparative Example 5 | 17,200 | 2.86 | 13° C. | 20% | 1.485 |

Mn (number average molecular weight) and PDI (polydispersity index used as a measure of molecular weight distribution) were measured using gel permeation chromatography (GPC) which uses polystyrene as a standard sample for calibration.

Tg (glass transition temperature) was measured using a differential scanning calorimeter (DSC).

Content of BPAA structural unit was measured by nuclear magnetic resonance (NMR).

Refractive index was measured by an ellipsometer.

Preparation of Anti-Forgery Color Conversion Film

Example 1

The poly(VP-BPAA) prepared in Preparative Example 1 having a low refractive index was dissolved in ethyl lactate to prepare a low refractive index dispersion composition, and the poly(VC-BPA) prepared in Preparative Example 3 having a high refractive index was dissolved in chloroform to prepare a high refractive index dispersion composition. The high refractive index dispersion composition was applied to a glass substrate using a spin coater, and then cured at a wavelength of 365 nm for 15 minutes to form a high refractive index layer having a thickness of 120 nm. The low refractive index dispersion composition was applied to the high refractive index layer using the spin coater, and then cured at a wavelength of 365 nm for 10 minutes to form a low refractive index layer having a thickness of a 100 nm. The high refractive index layer and the low refractive index layer were repeatedly laminated on the low refractive index layer to manufacture a photonic crystal structure in which a total of five refractive index layers were laminated.

Example 2

The poly(AA-BPAA) prepared in Preparative Example 2 having a low refractive index was dissolved in tetrahydrofuran to prepare a low refractive index dispersion composition, and the poly(VC-BPA) prepared in Preparative Example 3 having a high refractive index was dissolved in chloroform to prepare a high refractive index dispersion composition. The high refractive index dispersion composition was applied to a glass substrate using a spin coater, and then cured at a wavelength of 365 nm for 15 minutes to form a high refractive index layer having a thickness of 120 nm. The glass substrate having the high refractive index layer formed thereon was placed in a chloroform solution to remove uncured portions. The low refractive index dispersion composition was applied to the high refractive index layer using the spin coater, and then cured at a wavelength of 365 nm for 10 minutes to form a low refractive index layer having a thickness of 100 nm. The high refractive index layer and the low refractive index layer were repeatedly laminated on the low refractive index layer to manufacture a photonic crystal structure in which a total of seven refractive index layers were laminated.

Example 3

1 g of the poly(p-MS-BPAA) prepared in Preparative Example 4 having a high refractive index was dissolved in tetrahydrofuran to prepare a high refractive index dispersion composition, and 2 g of the poly(FEAA-BPAA) prepared in Preparative Example 5 was dissolved in ethyl acetate to prepare a low refractive index dispersion composition. The high refractive index dispersion composition was applied to a PET substrate using a spin coater, and then cured at a wavelength of 365 nm for 5 minutes to form a high refractive index layer having a thickness of 100 nm. The PET substrate having the high refractive index layer formed thereon was placed in a tetrahydrofuran solution to remove uncured portions. The low refractive index dispersion composition was applied to the high refractive index layer using the spin coater, and then cured at a wavelength of 365 nm for 5 minutes to form a low refractive index layer having a thickness of 80 nm. The glass substrate having the high refractive index layer and the low refractive index layer formed thereon was placed in an ethyl acetate solution to remove the uncured portions. The high refractive index layer and the low refractive index layer were repeatedly laminated on the low refractive index layer to manufacture a photonic crystal structure in which a total of seven refractive index layers were laminated.

Example 4

1 g of the poly(p-MS-BPAA) prepared in Preparative Example 4 having a high refractive index was dissolved in tetrahydrofuran to prepare a high refractive index dispersion composition, and 2 g of the poly(FEAA-BPAA) prepared in Preparative Example 5 was dissolved in ethyl acetate to prepare a low refractive index dispersion composition. The high refractive index dispersion composition was applied to a PET substrate using a spin coater, and a KRICT mask was placed on the PET substrate, followed by curing at a wavelength of 365 nm for 5 minutes to form a high refractive index layer having a thickness of 120 nm. The PET substrate having the high refractive index layer formed thereon was placed in a tetrahydrofuran solution to remove uncured portions. The low refractive index dispersion composition was applied to the high refractive index layer using the spin coater, and the KRICT mask was placed on the PET substrate, followed by curing at a wavelength of 365 nm for 5 minutes to form a low refractive index layer having a thickness of 70 nm. A process of applying a third layer was performed in the same manner as described above, and from fourth and fifth layers, only the RICT except for K were masked and cured, from sixth and seventh layers, only ICT except for KR were masked and cured, from eighth and ninth layers, only the CT except for KRI were masked and cured, and from tenth and eleventh layers, only the T except for KRIC was masked and cured. Therefore, the high refractive index layer and the low refractive index layer were repeatedly laminated to manufacture a photonic crystal structure in which a total of eleven refractive index layers were laminated.

Example 5

1 g of the poly(VC-BPA) prepared in Preparative Example 3 having a high refractive index was dissolved in chloroform to prepare a high refractive index dispersion composition, and 2 g of the poly(FEAA-BPAA) prepared in Preparative Example 5 was dissolved in ethyl acetate to prepare a low refractive index dispersion composition. The high refractive index dispersion composition was applied to a PET substrate using a spin coater, and then cured at a wavelength of 365 nm for 5 minutes to form a high refractive index layer having a thickness of 100 nm. The PET substrate having the high refractive index layer formed thereon was placed in a chloroform solution to remove uncured portions. The low refractive index dispersion composition was applied to the high refractive index layer using the spin coater, and then cured at a wavelength of 365 nm for 5 minutes to form a low refractive index layer having a thickness of 80 nm. The glass substrate having the high refractive index layer and the low refractive index layer formed thereon was placed in an ethyl acetate solution to remove the uncured portions. The high refractive index layer and the low refractive index layer were repeatedly laminated on the low refractive index layer to manufacture a photonic crystal structure in which a total of seven refractive index layers were laminated.

Figure 2:
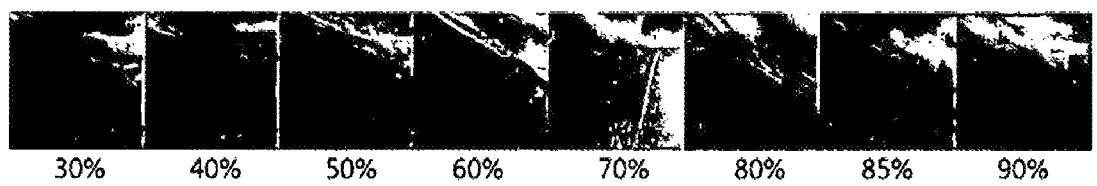
FIG. 2 are photographs illustrating a color conversion according to a change in a relative humidity of a color conversion film fabricated in Example 1.
Figure 3:
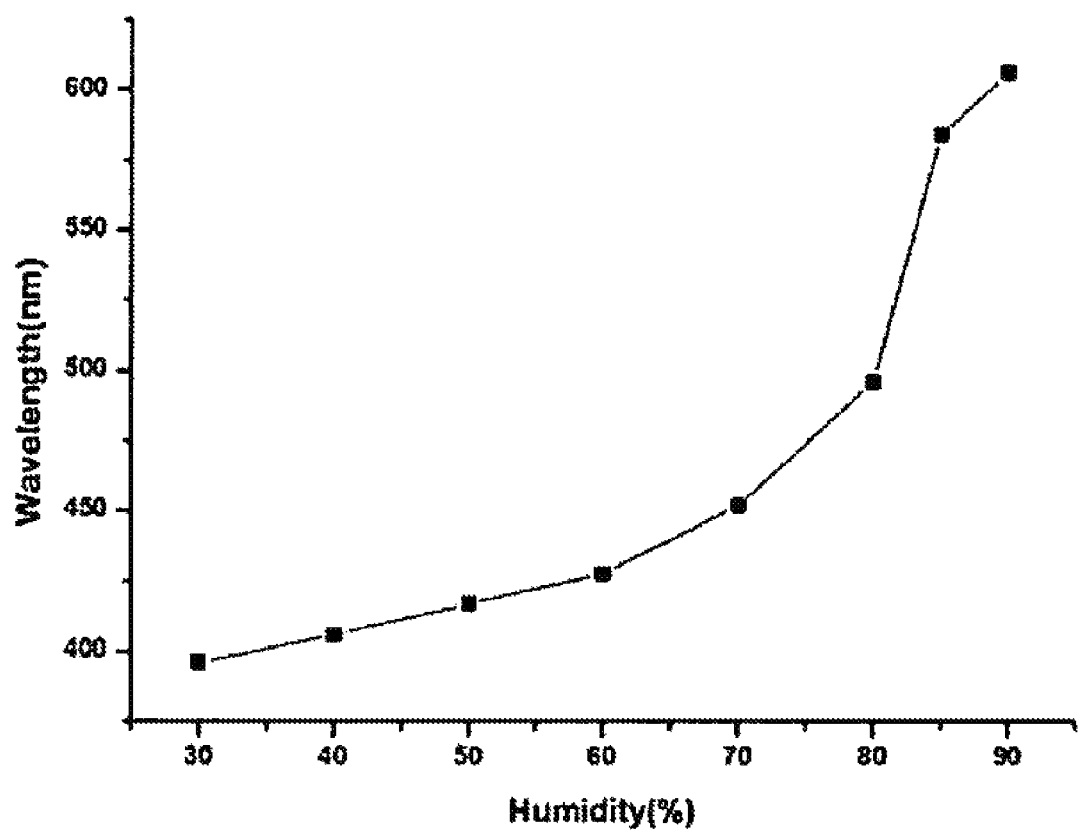
FIG. 3 is a graph illustrating a regular reflection rate according to the change in the relative humidity of the color conversion film fabricated in Example 1.

Experimental Example 2: Observation of Color Conversion in Color Conversion Film According to Change in Relative Humidity A regular reflection rate of the color conversion film fabricated in Example 1 according to a change in the relative humidity (30%, 40%, 50%, 60%, 70%, 80%, 85% and 90%) was measured with a reflectometer (USB 4000, Ocean Optics), and the measured results of the regular reflection rate and the color conversion photographs are shown in FIGS. 2 and 3, respectively.

Figure 4:
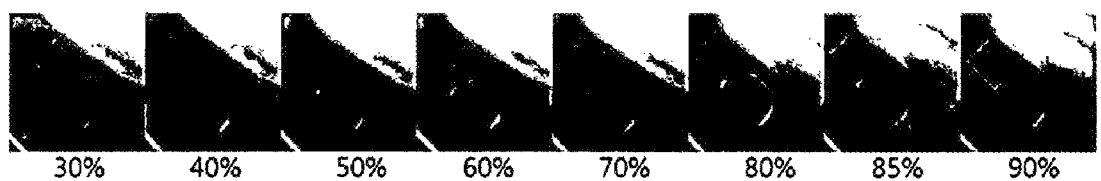
FIG. 4 are photographs illustrating a color conversion according to a change in the relative humidity of a color conversion film fabricated in Example 2.
Figure 5:
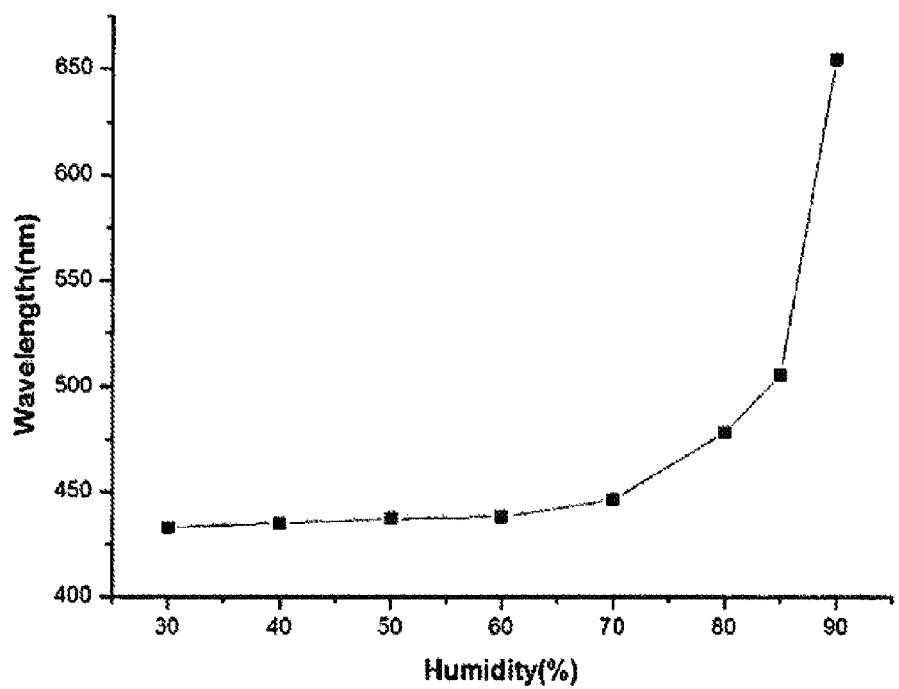
FIG. 5 is a graph illustrating a regular reflection rate according to the change in the relative humidity of the color conversion film fabricated in Example 2.

In addition, a regular reflection rate of the color conversion film fabricated in Example 2 according to a change in the relative humidity (30%, 40%, 50%, 60%, 70%, 80%, 85% and 90%) was measured with a reflectometer (USB 4000, Ocean Optics), and the measured results of the regular reflection rate and the color conversion photographs are shown in FIGS. 4 and 5, respectively.

Figure 6:
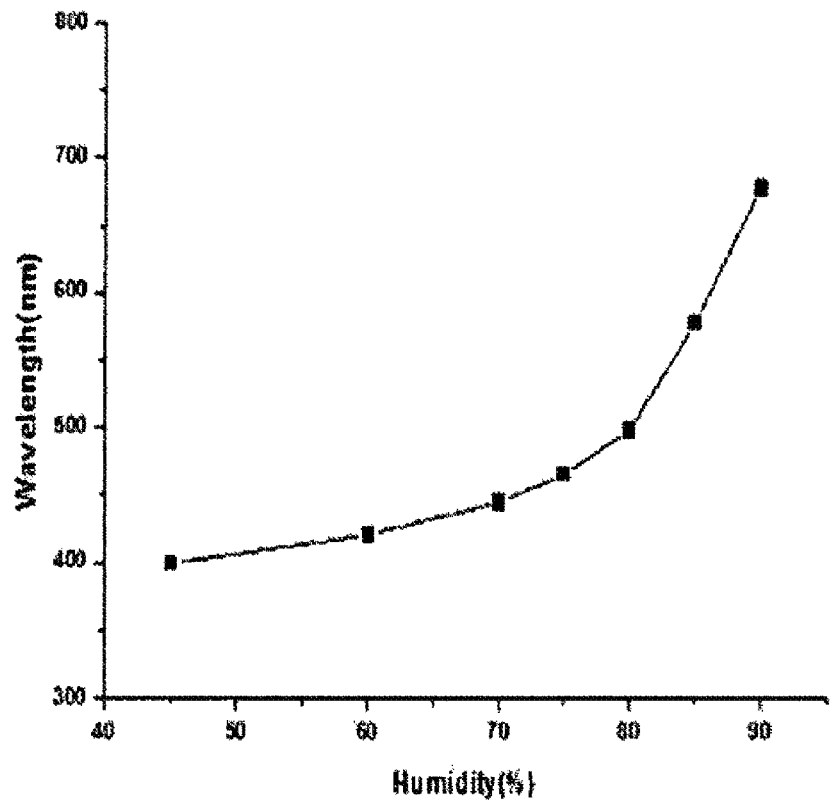
FIG. 6 is a graph illustrating a regular reflection rate according to a change in the relative humidity of a color conversion film fabricated in Example 3.
Figure 7:
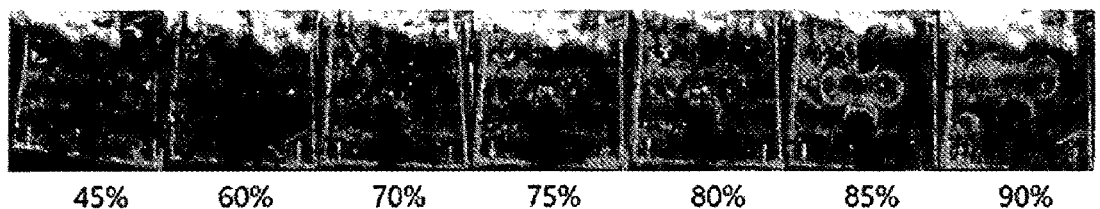
FIG. 7 are photographs illustrating a color conversion according to the change in the relative humidity of the color conversion film fabricated in Example 3.

A regular reflection rate of the color conversion film fabricated in Example 3 according to a change in the relative humidity (30%, 40%, 50%, 60%, 70%, 80%, 85% and 90%) was measured with a reflectometer (USB 4000, Ocean Optics), and the measured results of the regular reflection rate and the color conversion photographs are shown in FIGS. 6 and 7, respectively.

Figure 8:
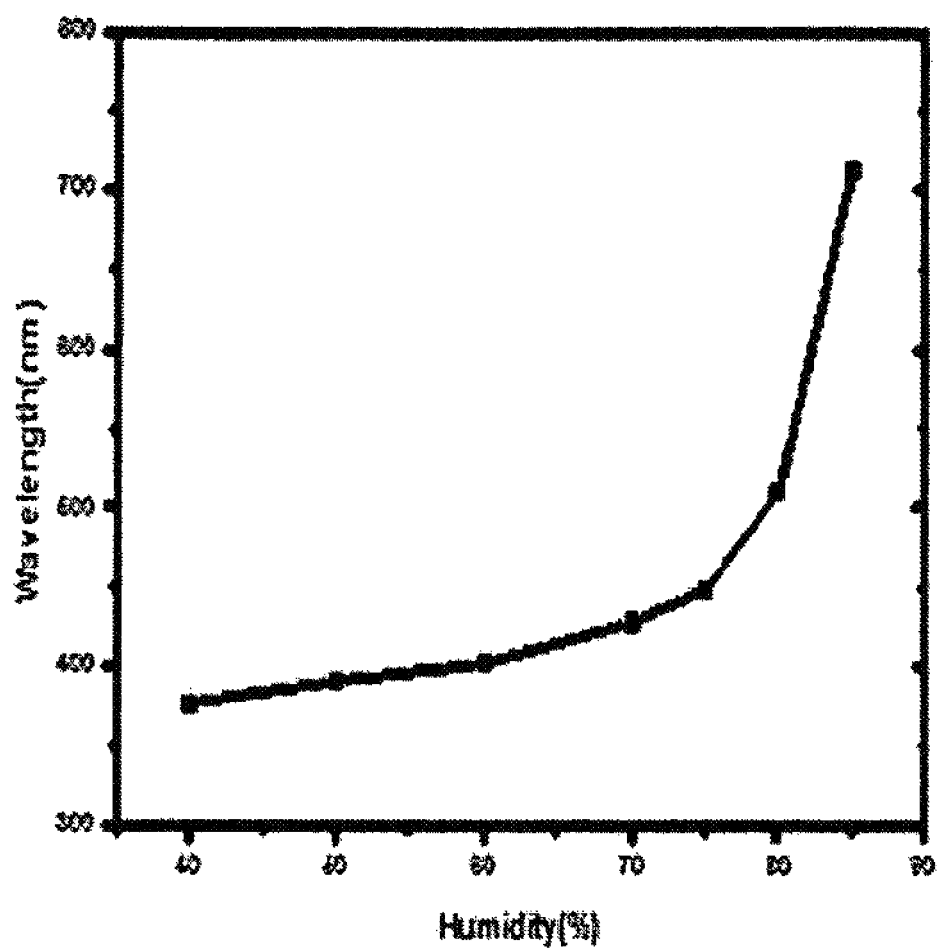
FIG. 8 is a graph illustrating a regular reflection rate according to a change in the relative humidity of a color conversion film fabricated in Example 5.
Figure 9:
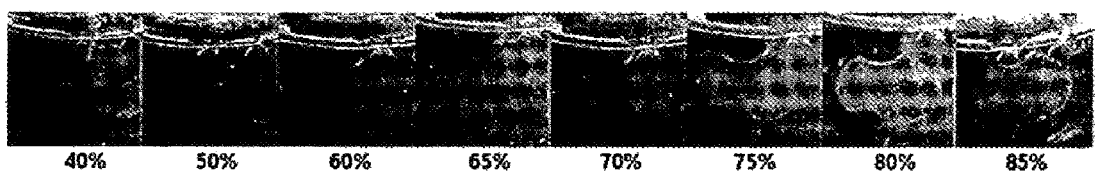
FIG. 9 are photographs illustrating a color conversion according to the change in the relative humidity of the color conversion film fabricated in Example 5.

Further, a regular reflection rate of the color conversion film fabricated in Example 5 according to a change in the relative humidity (30%, 40%, 50%, 60%, 70%, 80%, 85% and 90%) was measured with a reflectometer (USB 4000, Ocean Optics), and the measured results of the regular reflection rate and the color conversion photographs are shown in FIGS. 8 and 9, respectively.

As shown in FIGS. 2 to 9, it could be confirmed that, when the relative humidity is 70% or more, the reflection wavelength of the color conversion films fabricated in Examples 1, 2, 3 and 5 was remarkably shifted to exhibit a clear color conversion. At this time, the shifted reflection wavelength corresponds to a visible light region, such that the color conversion of the color conversion film according to the change in the relative humidity could be visually observed.

Experimental Example 3: Observation of Color Conversion in Color Conversion Film by Breath In order to confirm whether color conversion occurs when blowing a breath on the color conversion films fabricated in Examples 2 and 4, the color conversion films are attached to an article, and then blowing a breath thereon to take photographs. The obtained color conversion photographs are shown in FIGS. 10 and 11, respectively.

Figure 10:
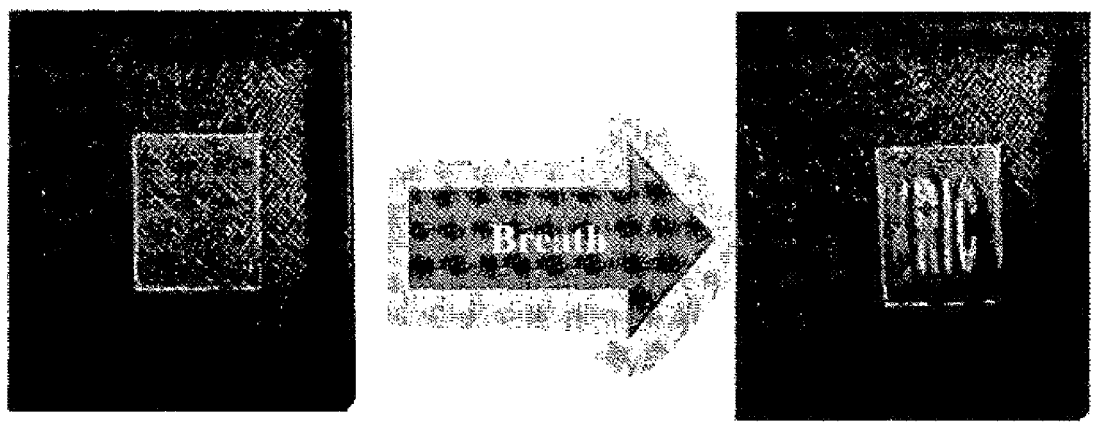
FIG. 10 are photographs illustrating a color conversion of the color conversion film fabricated in Example 2 by a breath.
Figure 11:
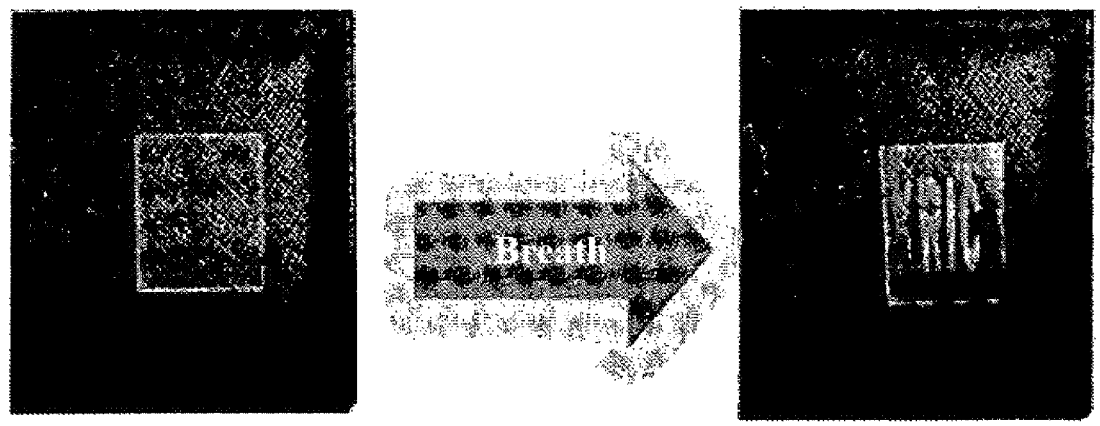
FIG. 11 are photographs illustrating a color conversion of the color conversion film fabricated in Example 4 by a breath.

As shown in FIGS. 10 and 11, it can be seen that the identification indicator does not appear before the blowing a breath, but the identification indicator clearly appears only by blowing the breath. Therefore, it can be seen that the consumer who purchases the article to which the anti-forgery color conversion film according to the present invention is attached may easily discriminate the authenticity of the article.

DESCRIPTION OF REFERENCE NUMERALS

10: Photonic crystal structure,
11: First refractive index layer
12: Second refractive index layer

What is claimed is:

1. An anti-forgery color conversion film comprising:
a photonic crystal structure whose color is converted by an external stimulus,
wherein the photonic crystal structure comprises:
a first refractive index layer including a first polymer exhibiting a first refractive index; and
a second refractive index layer which is alternately laminated with the first refractive index layer and includes a second polymer exhibiting a second refractive index,
wherein the first refractive index and the second refractive index are different from each other, and
one of the first polymer and the second polymer is a copolymer including a repeating unit represented by Formula 1 below:

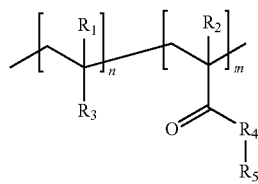

[Formula 1]

wherein $R_1$ and $R_2$ are each independently hydrogen or $C_{1-3}$ alkyl;
$R_3$ is represented by Formula 2 or 3 below;
$R_4$ is O or NH;
$R_5$ is benzoylphenyl, wherein the benzoylphenyl is unsubstituted, or substituted with one to four substituents each independently selected from the group consisting of hydroxy, halogen, nitro, $C_{1-5}$ alkyl and $C_{1-5}$ alkoxy;

n and m are each independently an integer of 1 or more, and
n+m is 100 to 2,000;

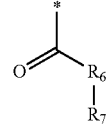

[Formula 2]

wherein $R_6$ is O or NH;
$R_7$ is H, $C_{1-10}$ alkyl, $C_{1-10}$ aminoalkyl, fluoroalkyl or

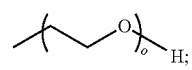

and
o is an integer of 1 to 10;

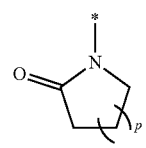

[Formula 3]

wherein p is an integer of 1 to 4.

2. The anti-forgery color conversion film according to claim 1, wherein $R_1$ and $R_2$ are each independently hydrogen or methyl,
$R_3$ is represented by Formula 2,
$R_6$ is NH, and
$R_7$ is fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1-fluoropropyl, 2-fluoropropyl, 1,1-difluoropropyl, 1,2-difluoropropyl, 2,2-difluoropropyl, 1,1,2-trifluoropropyl, 1,2,2-trifluoropropyl, 2,2,2-trifluoropropyl, 1-fluorobutyl, 2-fluorobutyl, 1,1-difluorobutyl, 1,2-difluorobutyl, 2,2-difluorobutyl, 1,1,2-trifluorobutyl, 1,2,2-trifluorobutyl, or 2,2,2-trifluorobutyl.

3. The anti-forgery color conversion film according to claim 1, wherein the copolymer represented by Formula 1 is one of copolymers including repeating units represented by Formulae 1-1 to 1-10 below:

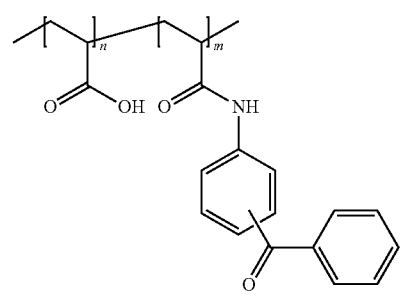

[Formula 1-1]

[Formula 1-2] 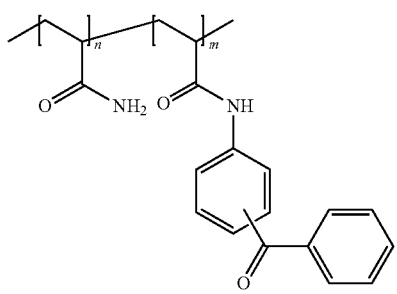

[Formula 1-3] 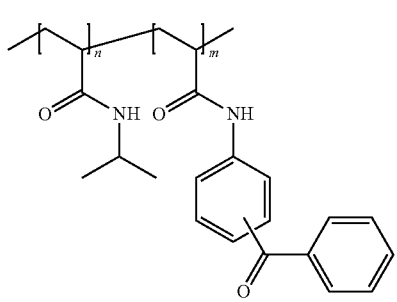

[Formula 1-4] 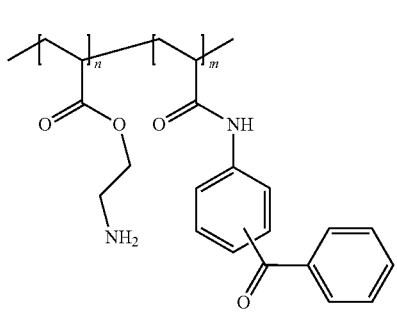

[Formula 1-5] 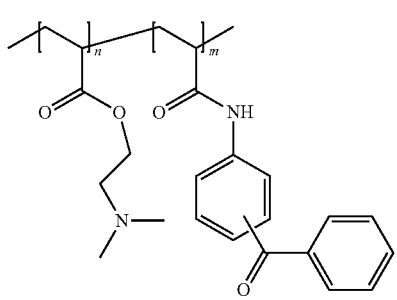

[Formula 1-6] 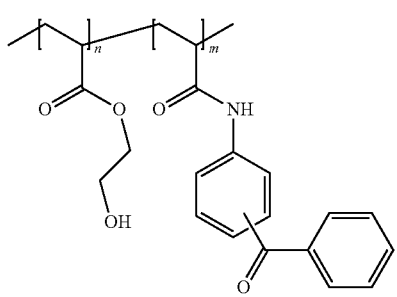

[Formula 1-7] 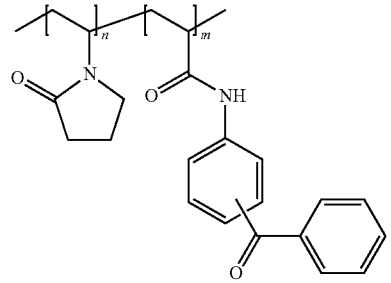

[Formula 1-8] 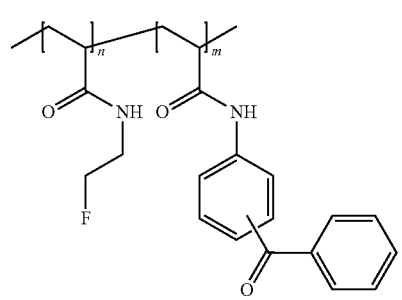

[Formula 1-9] 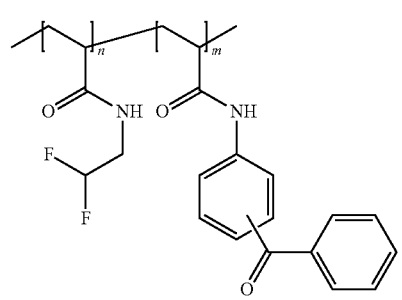

[Formula 1-10] 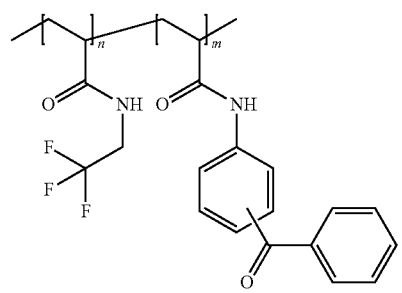

wherein n and m are each independently an integer of 1 or more, and n+m is 100 to 2,000.

4. The anti-forgery color conversion film according to claim 1, wherein the external stimulus is a relative humidity of 70% or more.

5. The anti-forgery color conversion film according to claim 1, comprising a plurality of photonic crystal structures, wherein the respective photonic crystal structures are converted into different colors from each other by the external stimulus.

6. The anti-forgery color conversion film according to claim 1, wherein the copolymer including the repeating unit represented by Formula 1 is swelled by the external stimulation, such that a reflection wavelength thereof is shifted.

7. The anti-forgery color conversion film according to claim 1, wherein another of the first polymer and the second polymer is a copolymer including a repeating unit represented by Formula 4 or 5 below:

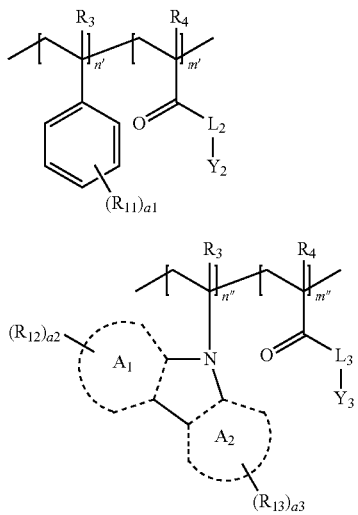

[Formula 4]

[Formula 5]

wherein $R_3$ to $R_6$ are each independently hydrogen or $C_{1-3}$ alkyl;

$A_1$ and $A_2$ are each independently a $C_{6-20}$ aromatic ring or $C_{2-20}$ heteroaromatic ring;

$R_{11}$ to $R_{13}$ are each independently hydroxy, cyano, nitro, amino, halogen, $SO_3H$, $SO_3(C_{1-5}$ alkyl), $C_{1-10}$ alkyl or $C_{1-10}$ alkoxy;

a1 to a3 are each independently an integer of 0 to 5;

$L_2$ and $L_3$ are each independently O or NH;

$Y_2$ and $Y_3$ are each independently benzoylphenyl;

$Y_2$ and $Y_3$ are unsubstituted, or substituted with one to four substituents each independently selected from the group consisting of hydroxy, halogen, nitro, $C_{1-5}$ alkyl and $C_{1-5}$ alkoxy;

n' and m' are each independently an integer of 1 or more; n'+m' is 100 to 2,000;

n" and m" are each independently an integer of 1 or more; and n"+m" is 100 to 2,000.

8. The anti-forgery color conversion film according to claim 7, wherein $R_3$ to $R_6$ are each independently hydrogen or methyl, $A_1$ and $A_2$ are each independently a benzene ring or naphthalene ring, $R_{11}$ to $R_{13}$ are each independently hydrogen, methyl, ethyl, propyl, isopropyl, butyl, isobutyl, sec-butyl or tert-butyl, and a1 to a3 are each independently 0, 1 or 2.

9. The anti-forgery color conversion film according to claim 7, wherein the copolymer is a copolymer including a repeating unit represented by Formula 5-1 or 5-2 below:

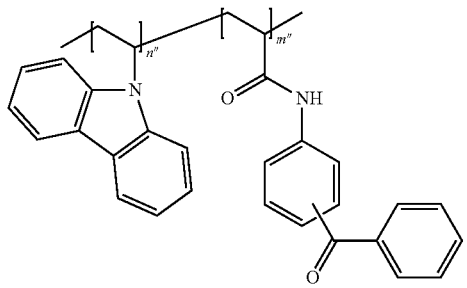

[Formula 5-1]

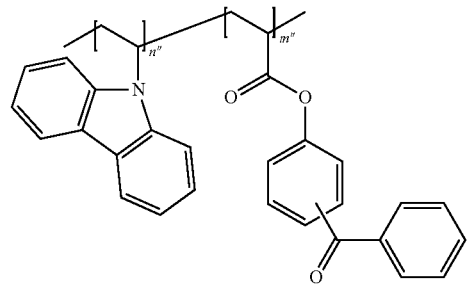

[Formula 5-2]

wherein n" and m" are each independently an integer of 1 or more, and n"+m" is 100 to 2,000.

10. The anti-forgery color conversion film according to claim 5, wherein the plurality of photonic crystal structures have each independently 3 to 30 layers as a total number of the laminated layers of the first refractive index layer and the second refractive index layer.

11. The anti-forgery color conversion film according to claim 1, wherein the first refractive index layer is a high refractive index layer having a thickness of 50 to 150 nm, and the second refractive index layer is a low refractive index layer having a thickness of 5 to 100 nm.

12. An article comprising the anti-forgery color conversion film of claim 1.

13. A photonic crystal structure whose color is converted by an external stimulus, comprising: a first refractive index layer including a first polymer exhibiting a first refractive index; and a second refractive index layer which is alternately laminated with the first refractive index layer and includes a second polymer exhibiting a second refractive index, wherein the first refractive index and the second refractive index are different from each other; and one of the first polymer and the second polymer is a copolymer including a repeating unit represented by Formula 1 below:

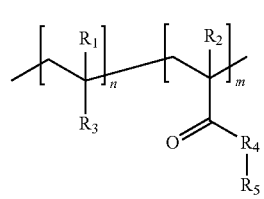

[Formula 1]

wherein $R_1$ and $R_2$ are each independently hydrogen or $C_{1-3}$ alkyl;

$R_3$ is represented by Formula 2 or 3 below;

$R_4$ is O or NH;

$R_5$ is benzoylphenyl, wherein the benzoylphenyl is unsubstituted, or substituted with one to four substituents each independently selected from the group consisting of hydroxy, halogen, nitro, $C_{1-5}$ alkyl and $C_{1-5}$ alkoxy;

n and m are each independently an integer of 1 or more; and n+m is 100 to 2,000;

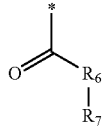
[Formula 2]

wherein $R_6$ is O or NH;

$R_7$ is H, $C_{1-10}$ alkyl, $C_{1-10}$ aminoalkyl, $C_{1-10}$ fluoroalkyl or

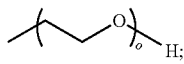

and o is an integer of 1 to 10;

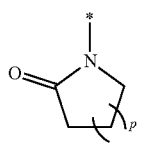
[Formula 3]

wherein p is an integer of 1 to 4.

14. The photonic crystal structure according to claim 13, wherein $R_1$ and $R_2$ are each independently hydrogen or methyl;

$R_3$ is represented by Formula 2;

$R_6$ is NH; and $R_7$ is fluoromethyl, difluoromethyl, trifluoromethyl, 1-fluoroethyl, 2-fluoroethyl, 1,1-difluoroethyl, 1,2-difluoroethyl, 2,2-difluoroethyl, 1,1,2-trifluoroethyl, 1,2,2-trifluoroethyl, 2,2,2-trifluoroethyl, 1-fluoropropyl, 2-fluoropropyl, 1,1-difluoropropyl, 1,2-difluoropropyl, 2,2-difluoropropyl, 1,1,2-trifluoropropyl, 1,2,2-trifluoropropyl, 2,2,2-trifluoropropyl, 1-fluorobutyl, 2-fluorobutyl, 1,1-difluorobutyl, 1,2-difluorobutyl, 2,2-difluorobutyl, 1,1,2-trifluorobutyl, 1,2,2-trifluorobutyl, or 2,2,2-trifluorobutyl.

15. The photonic crystal structure according to claim 13, wherein the copolymer represented by Formula 1 is one of copolymers including repeating units represented by Formulae 1-1 to 1-10 below:

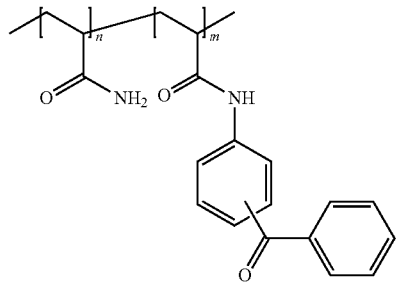
[Formula 1-1]

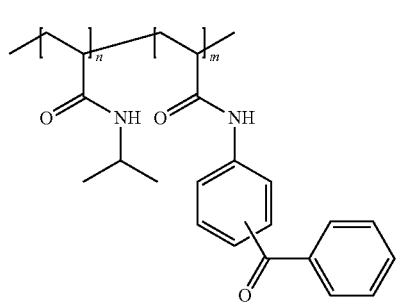
[Formula 1-2]

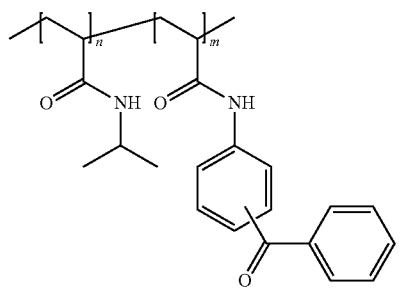
[Formula 1-3]

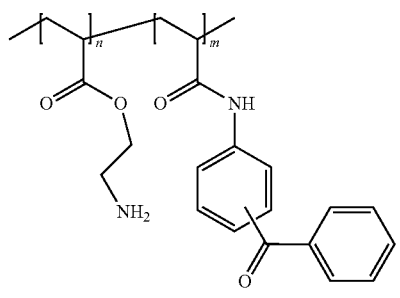
[Formula 1-4]

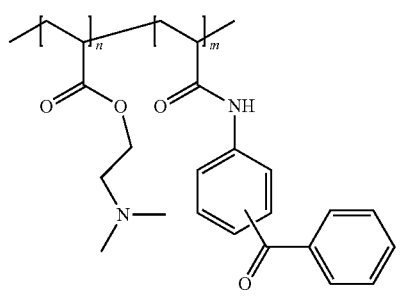
[Formula 1-5]

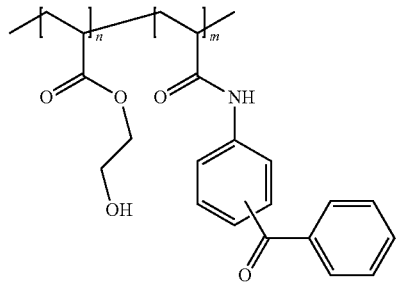
[Formula 1-6]

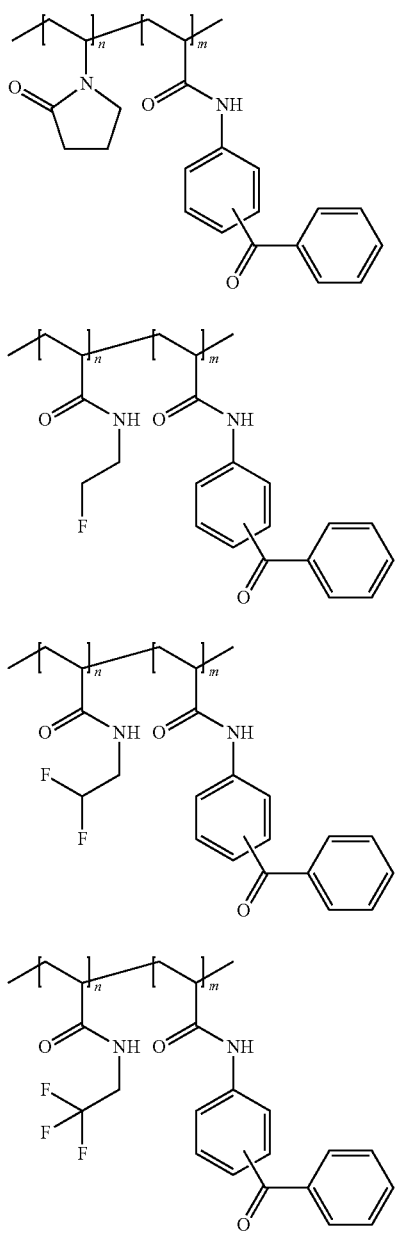

[Formula 1-7]

[Formula 1-8]

[Formula 1-9]

[Formula 1-10]

wherein n and m are each independently an integer of 1 or more, and n+m is 100 to 2,000.

16. The photonic crystal structure according to claim 13, wherein the external stimulus is a relative humidity of 70% or more.

17. The photonic crystal structure according to claim 13, wherein the copolymer including the repeating unit represented by Formula 1 is swelled by the external stimulation, such that a reflection wavelength thereof is shifted.

18. The photonic crystal structure according to claim 13, wherein another of the first polymer and the second polymer is a copolymer including a repeating unit represented by Formula 4 or 5 below:

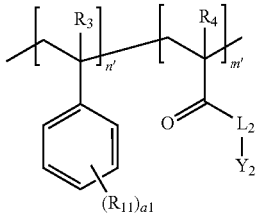

[Formula 4]

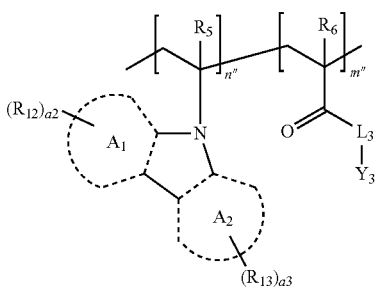

[Formula 5]

wherein $R_3$ to $R_6$ are each independently hydrogen or $C_{1-3}$ alkyl;

$A_1$ and $A_2$ are each independently a $C_{6-20}$ aromatic ring or $C_{2-20}$ heteroaromatic ring;

$R_{11}$ to $R_{13}$ are each independently hydroxy, cyano, nitro, amino, halogen, $SO_3H$, $SO_3(C_{1-5}$ alkyl), $C_{1-10}$ alkyl or $C_{1-10}$ alkoxy;

a1 to a3 are each independently an integer of 0 to 5;

$L_2$ and $L_3$ are each independently O or NH;

$Y_2$ and $Y_3$ are each independently benzoylphenyl;

$Y_2$ and $Y_3$ are unsubstituted, or substituted with one to four substituents each independently selected from the group consisting of hydroxy, halogen, nitro, $C_{1-5}$ alkyl and $C_{1-5}$ alkoxy;

n' and m' are each independently an integer of 1 or more;

n'+m' is 100 to 2,000;

n" and m" are each independently an integer of 1 or more; and n"+m" is 100 to 2,000.

19. The photonic crystal structure according to claim 18, wherein $R_3$ to $R_6$ are each independently hydrogen or methyl, $A_1$ and $A_2$ are each independently a benzene ring or naphthalene ring, $R_{11}$ to $R_{13}$ are each independently hydrogen, methyl, ethyl, propyl, isopropyl, butyl, isobutyl, sec-butyl or tert-butyl, and a1 to a3 are each independently 0, 1 or 2.

20. The photonic crystal structure according to claim 18, wherein the copolymer is a copolymer including a repeating unit represented by Formula 5-1 or 5-2 below:

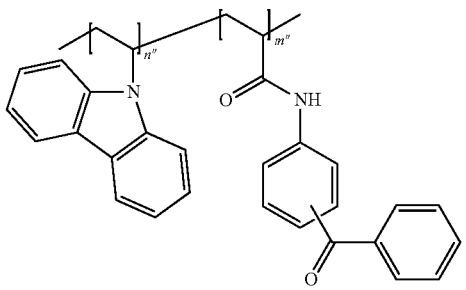

[Formula 5-1]

[Formula 5-2]
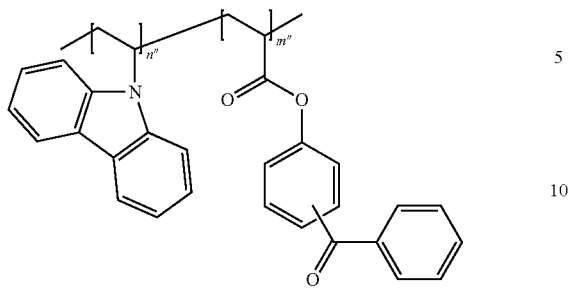
wherein n" and m" are each independently an integer of 1 or more, and n"+m" is 100 to 2,000.